(12) United States Patent
Qu et al.

(10) Patent No.: US 9,655,174 B2
(45) Date of Patent: May 16, 2017

(54) MULTI-STRING LED DRIVER WITH CURRENT BALANCING

(71) Applicant: The Hong Kong Polytechnic University, Hong Kong (HK)

(72) Inventors: Xiaohui Qu, Hong Kong (HK); Siu-Chung Wong, Hong Kong (HK); Chi Kong Tse, Hong Kong (HK)

(73) Assignee: The Hong Kong Polytechnic University, Hong Kong (HK)

( * ) Notice: Subject to any disclaimer, the term of this patent is extended or adjusted under 35 U.S.C. 154(b) by 0 days.

(21) Appl. No.: 14/798,596

(22) Filed: Jul. 14, 2015

(65) Prior Publication Data

US 2017/0019960 A1    Jan. 19, 2017

(51) Int. Cl.
*H05B 33/08* (2006.01)

(52) U.S. Cl.
CPC ..... *H05B 33/0809* (2013.01); *H05B 33/0827* (2013.01)

(58) Field of Classification Search
CPC .................. H05B 33/0809; H05B 33/0827
USPC ...................................... 315/185 R
See application file for complete search history.

(56) References Cited

U.S. PATENT DOCUMENTS

| | | | | |
|---|---|---|---|---|
| 2010/0270947 A1* | 10/2010 | Chang | ............... | H02M 3/33569 315/294 |
| 2011/0006605 A1* | 1/2011 | Chang | ............... | H02J 1/10 307/31 |
| 2011/0080102 A1* | 4/2011 | Ge | ............... | H05B 33/0815 315/200 R |
| 2011/0316430 A1* | 12/2011 | Cohen | ............... | H02M 3/33561 315/161 |
| 2015/0145426 A1* | 5/2015 | Zhong | ............... | H05B 33/0827 315/192 |
| 2015/0163882 A1* | 6/2015 | Zhang | ............... | H05B 33/0887 372/38.01 |
| 2015/0289331 A1* | 10/2015 | Chen | ............... | H05B 33/0851 315/186 |

OTHER PUBLICATIONS

D. A. Steigerwald, J. C. Bhat, D. Collins, R. M. Fletcher, M. O. Holcomb, and M. J. Ludowise, "Illumination with solid state lighting technology," IEEE J. Selected Topics in Quantum Electronics, vol. 8, No. 2, pp. 310-320, Mar./Apr. 2002.

(Continued)

*Primary Examiner* — Dylan White

(74) *Attorney, Agent, or Firm* — Spruson & Ferguson (Hong Kong) Limited

(57) ABSTRACT

The present invention discloses a current-source-output light-emitting-diode (LED) driver based on LCLC circuit to provide a constant output current regardless of variations in LED parameters. In the LCLC circuit, the number of additional capacitors is scalable with the number of LED strings for current balancing. Moreover, the input impedance of the improved LCLC circuit is designed to be resistive at the operating frequency to minimize reactive power. The conventional duty cycle control can easily incorporate zero-voltage-switching (ZVS).

8 Claims, 17 Drawing Sheets

(56) References Cited

OTHER PUBLICATIONS

C. Y. Wu, T.F. Wu, J. R. Tsai, Y. M. Chen, and C. C. Chen, "Multistring LED backlight driving system for LCD panels with color sequential display and area control," IEEE Trans. on Industrial Electronics, vol. 55, No. 10, pp. 3791-3800, Oct. 2008.

X. Qu, S. C. Wong, and C. K. Tse, "Resonance-assisted buck converter for offline driving of power LED replacement lamps," IEEE Trans. on Power Electronics, vol. 26, No. 2, pp. 532-540, Feb. 2011.

Q. Hu and R. Zane, "Minimizing required energy storage in off-line LED drivers based on series-input converter modules," IEEE Trans. on Power Electronics, vol. 26, No. 10, pp. 2887-2895, Oct. 2011.

K. I. Hwu and Y. T. Yau, "Applying one-comparator counter-based sampling to current sharing control of multichannel LED strings," IEEE Trans. on Industry Applications, vol. 47, No. 6, pp. 2413-2421, Nov./Dec. 2011.

X. Qu, S.C.Wong and C.K. Tse, "Non-cascading structure for electronic ballast design for multiple LED lamps with independent brightness control," IEEE Trans. on Power Electronics, vol. 25, No. 2, pp. 331-340, Feb. 2010.

W. Chen and S. Y. R. Hui, "A dimmable light-emitting diode driver with mag-amp postregulators for multistring applications," IEEE Trans. on Power Electronics, vol. 26, No. 6, pp. 1714-1722, Jun. 2011.

S. N. Li, W. X. Zhong, W. Chen, and S. Y. R. Hui, "Novel selfconfigurable current-mirror techniques for reducing current imbalance in parallel light-emitting diode(LED) strings," IEEE Trans. on Power Electronics, vol. 27, No. 4, pp. 2153-2162, Apr. 2012.

Y. Hu and M. M. Jovanovic, "LED driver with self-adaptive drive voltage," IEEE Trans. on Power Electronics, vol. 23, No. 6, pp. 3116-3125, Nov. 2008.

H. J. Chiu, Y. K. Lo, J. T. Chen, S. J. Cheng, C. Y. Lin, and S. C. Mou, "A high-efficiency dimmable LED driver for low-power lighting applications," IEEE Trans. on Industrial Electronics, vol. 57, No. 2, pp. 735-743, Feb. 2010.

X. Qu, S.C. Wong, and C.K. Tse, "A current balancing scheme with high luminous efficacy for high-power LED lighting," IEEE Trans. on Power Electronics, vol. 29, No. 6, pp. 2649-2654, Jun. 2014.

X. Wu, Z. Wang, and J. Zhang, "Design considerations for dual-output quasi-resonant flyback LED driver with current-sharing transformer," IEEE Trans. on Power Electronics, vol. 28, No. 10, pp. 4820-4830, Oct. 2013.

J. Zhang, L. Xu, X. Wu, and Z. Qian, "A precise passive current balancing method for multioutput LED drivers," IEEE Trans. on Power Electronics, vol. 26, No. 8, pp. 2149-2159, Aug. 2011.

J. Zhang, J. Wang, and X. Wu, "A capacitor-isolated LED driver with inherent current balance capability," IEEE Trans. on Industrial Electronics, vol. 59, No. 4, pp. 1708-1716, Apr. 2012.

H. Wu, S. Ji, F. C. Lee, and X. Wu, "Multi-channel constant current (MC3) LLC resonant LED driver," IEEE Energy Conversion Congress and Expo., pp. 2568-2575, 2011.

X. Wu, J. Zhang, and Z. Qian, "A simple two-channel LED driver with automatic precise current sharing," IEEE Trans. on Industrial Electronics, vol. 58, No. 10, pp. 4783-4788, Oct. 2011.

K. I. Hwu and S. C. Chou, "A simple current-balancing converter for LED lighting," IEEE Applied Power Electronics Conf., pp. 587-590, 2009.

K. H. Jung, J. W. Yoo, and C. Y. Park, "A design of current balancing circuit for parallel connected LED strings using balancing transformers," IEEE International Conf. on Power Electronics—ECCE Asia, pp. 528-535, 2011.

Y. Hu and M. M. Jovanovic, "A new current-balancing method for paralleled LED strings," IEEE Applied Power Electronics Conf. and Expo., pp. 705-712, 2011.

R. Zhang and H. S. H. Chung, "Use of daisy-chained transformers for current-balancing multiple LED strings," IEEE Trans. on Power Electronics, vol. 29, No. 3, pp. 1418-1433, Mar. 2014.

S. Zhang, Q. Chen, J. Sun, M. Xu, and Y. Qiu, "High accuracy passive current balancing schemes for large-scale LED backlight system," IEEE Applied Power Electronics Conf. and Expo., pp. 723-727, 2011.

X. Wu, C. Hu, J. Zhang, and C. Zhao, "Series-parallel autoregulated charge-balancing rectifier for multioutput light-emitting diode driver," IEEE Trans. on Industrial Electronics, vol. 61, No. 3, pp. 1262-1268, Mar. 2014.

S. M. Baddela and D. S. Zinger, "Parallel connected LEDs operated at high frequency to improve current sharing," IEEE Industry Applications Conf., pp. 1677-1681, 2004.

S. Choi and T. Kim, "Symmetric current-balancing circuit for LED backlight with dimming," IEEE Trans. on Industrial Electronics, vol. 59, No. 4, pp. 1698-1706, Apr. 2012.

C. Zhao, X. Xie, and S. Liu, "Multioutput LED drivers with precise passive current balancing," IEEE Trans. on Power Electronics, vol. 28, No. 3, pp. 1438-1448, Mar. 2013.

Q. Luo, S. Zhi, C. Zou, W. Lu, and L. Zhou, "An LED driver with dynamic high-frequency sinusoidal bus voltage regulation for multistring applications," IEEE Trans. on Power Electronics, vol. 29, No. 1, pp. 491-500, Jan. 2014.

Z. Ye, P. K. Jain, and P. C. Sen, "A full-bridge resonant inverter with modified phase-shift modulation for high-frequency AC power distribution systems," IEEE Trans. on Industrial Electronics, vol. 54, No. 5, pp. 2831-2845, Oct. 2007.

B. Lehman and A. J. Wilkins, "Designing to mitigate the effects of flicker in LED lighting reducing rishs to health and safety," IEEE Power Electronics Magazine, vol. 1, No. 3, pp. 18-26, Sep. 2014.

Cree Inc., "Cree Xlamp XR-E LED data sheet," 2009. [Online] Available: http://www.cree.com/products/pdf/XLamp7090XR-E. pdf.

* cited by examiner

MULTI-STRING LED DRIVER WITH CURRENT BALANCING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a multi-string LED driver with current balancing. More particularly, the present invention relates to an LCLC current-source-output multi-string LED driver with capacitive current balance.

BACKGROUND

List of References

The following references are cited in the specification. Disclosures of these references are incorporated herein by reference in their entirety.

[1] D. A. Steigerwald, J. C. Bhat, D. Collins, R. M. Fletcher, M. O. Holcomb, and M. J. Ludowise, "Illumination with solid state lighting technology," *IEEE J. Selected Topics in Quantum Electronics*, vol. 8, no. 2, pp. 310-320, March/April 2002

[2] C. Y. Wu, T. F. Wu, J. R. Tsai, Y. M. Chen, and C. C. Chen, "Multistring LED backlight driving system for LCD panels with color sequential display and area control," *IEEE Trans. on Industrial Electronics*, vol. 55, no. 10, pp. 3791-3800, October 2008.

[3] X. Qu, S. C. Wong, and C. K. Tse, "Resonance-assisted buck converter for offline driving of power LED replacement lamps," *IEEE Trans. on Power Electronics*, vol. 26, no. 2, pp. 532-540, February 2011.

[4] Q. Hu and R. Zane, "Minimizing required energy storage in off-line LED drivers based on series-input converter modules," *IEEE Trans. on Power Electronics*, vol. 26, no. 10, pp. 2887-2895, October 2011.

[5] K. I. Hwu and Y. T. Yau, "Applying one-comparator counter-based sampling to current sharing control of multichannel LED strings," *IEEE Trans. on Industry Applications*, vol. 47, no. 6, pp. 2413-2421, November/December 2011.

[6] X. Qu, S. C. Wong, and C. K. Tse, "Non-cascading structure for electronic ballast design for multiple LED lamps with independent brightness control," *IEEE Trans. on Power Electronics*, vol. 25, no. 2, pp. 331-340, February 2010.

[7] W. Chen and S. Y. R. Hui, "A dimmable light-emitting diode driver with mag-amp postregulators for multistring applications," *IEEE Trans. on Power Electronics*, vol. 26, no. 6, pp. 1714-1722, June 2011.

[8] S. N. Li, W. X. Zhong, W. Chen, and S. Y. R. Hui, "Novel selfconfigurable current-mirror techniques for reducing current imbalance in parallel light-emitting diode (LED) strings," *IEEE Trans. on Power Electronics*, vol. 27, no. 4, pp. 2153-2162, April 2012.

[9] Y. Hu and M. M. Jovanovic, "LED driver with self-adaptive drive voltage," *IEEE Trans. on Power Electronics*, vol. 23, no. 6, pp. 3116-3125, November 2008.

[10] H. J. Chiu, Y. K. Lo, J. T. Chen, S. J. Cheng, C. Y. Lin, and S. C. Mou, "A high-efficiency dimmable LED driver for low-power lighting applications," *IEEE Trans. on Industrial Electronics*, vol. 57, no. 2, pp. 735-743, February 2010.

[11] X. Qu, S. C. Wong, and C. K. Tse, "A current balancing scheme with high luminous efficacy for high-power LED lighting," *IEEE Trans. on Power Electronics*, vol. 29, no. 6, pp. 2649-2654, June 2014.

[12] X. Wu, Z. Wang, and J. Zhang, "Design considerations for dual-output quasi-resonant flyback LED driver with current-sharing transformer," *IEEE Trans. on Power Electronics*, vol. 28, no. 10, pp. 4820-4830, October 2013.

[13] J. Zhang, L. Xu, X. Wu, and Z. Qian, "A precise passive current balancing method for multioutput LED drivers," *IEEE Trans. on Power Electronics*, vol. 26, no. 8, pp. 2149-2159, August 2011.

[14] J. Zhang, J. Wang, and X. Wu, "A capacitor-isolated LED driver with inherent current balance capability," *IEEE Trans. on Industrial Electronics*, vol. 59, no. 4, pp. 1708-1716, April 2012.

[15] H. Wu, S. Ji, F. C. Lee, and X. Wu, "Multi-channel constant current (MC3) LLC resonant LED driver," *IEEE Energy Conversion Congress and Expo.*, pp. 2568-2575, 2011.

[16] X. Wu, J. Zhang, and Z. Qian, "A simple two-channel LED driver with automatic precise current sharing," *IEEE Trans. on Industrial Electronics*, vol. 58, no. 10, pp. 4783-4788, October 2011.

[17] K. I. Hwu and S. C. Chou, "A simple current-balancing converter for LED lighting," *IEEE Applied Power Electronics Conf.*, pp. 587-590, 2009.

[18] K. H. Jung, J. W. Yoo, and C. Y. Park, "A design of current balancing circuit for parallel connected LED strings using balancing transformers," *IEEE International Conf. on Power Electronics-ECCE Asia*, pp. 528-535, 2011.

[19] Y. Hu and M. M. Jovanovic, "A new current-balancing method for paralleled LED strings," *IEEE Applied Power Electronics Conf. and Expo.*, pp. 705-712, 2011.

[20] R. Zhang and H. S. H. Chung, "Use of daisy-chained transformers for current-balancing multiple LED strings," *IEEE Trans. on Power Electronics*, vol. 29, no. 3, pp. 1418-1433, March 2014.

[21] S. Zhang, Q. Chen, J. Sun, M. Xu, and Y. Qiu, "High accuracy passive current balancing schemes for large-scale LED backlight system," *IEEE Applied Power Electronics Conf. and Expo.*, pp. 723-727, 2011.

[22] X. Wu, C. Hu, J. Zhang, and C. Zhao, "Series-parallel autoregulated charge-balancing rectifier for multioutput light-emitting diode driver," *IEEE Trans. on Industrial Electronics*, vol. 61, no. 3, pp. 1262-1268, March 2014.

[23] S. M. Baddela and D. S. Zinger, "Parallel connected LEDs operated at high frequency to improve current sharing," *IEEE Industry Applications Conf.*, pp. 1677-1681, 2004.

[24] S. Choi and T. Kim, "Symmetric current-balancing circuit for LED backlight with dimming," *IEEE Trans. on Industrial Electronics*, vol. 59, no. 4, pp. 1698-1706, April 2012.

[25] C. Zhao, X. Xie, and S. Liu, "Multioutput LED drivers with precise passive current balancing," *IEEE Trans. on Power Electronics*, vol. 28, no. 3, pp. 1438-1448, March 2013.

[26] Q. Luo, S. Zhi, C. Zou, W. Lu, and L. Zhou, "An LED driver with dynamic high-frequency sinusoidal bus volt-

[27] Z. Ye, P. K. Jain, and P. C. Sen, "A full-bridge resonant inverter with modified phase-shift modulation for high-frequency AC power distribution systems," *IEEE Trans. on Industrial Electronics*, vol. 54, no. 5, pp. 2831-2845, October 2007.

[28] B. Lehman and A. J. Wilkins, "Designing to mitigate the effects of flicker in LED lighting reducing rishs to health and safety," *IEEE Power Electronics Magazine*, vol. 1, no. 3, pp. 18-26, September 2014.

[29] Cree Inc., "Cree Xlamp XR-E LED data sheet," 2009. [Online] Available: http://www.cree.com/products/pdf/XLamp7090XR-E.pdf.

With the development of light-emitting-diode (LED) devices for general lighting applications, LED manufacturers have focused on high-brightness high-power LED products to cope with the market trend [1]. For a better thermal design, an LED package usually has a power of less than 5 W per chip. Thus, a single LED package cannot emit enough luminance for general lighting applications. Therefore, a number of LEDs are usually connected together for various LED applications such as LCD backlighting, streetlight, general lighting, etc. [2], [3].

A single LED load can be economically driven by a single driver. Therefore, LEDs are mostly connected in parallel with several LED strings. Each LED string is formed by connecting several LEDs in series for a safe accumulative forward voltage. However, the voltage-to-current (V-I) characteristic of an LED inherently follows a statistical manufacturing spread and varies with temperature. Unequal current in each LED string is expected when a number of paralleled LED strings are connected to a common voltage terminal as a single load. Without current balancing mechanism, high current can be developed in some LED strings and those LED strings will be rapidly degraded or will even fail. It is therefore necessary to mitigate the current imbalance due to LED forward voltage variation especially in installations involving multiple LED strings and many attempts have been made to mitigate the problem of current imbalance.

The current imbalance of LED strings within an LED load is caused by unequal V-I curves of LED strings. To balance currents in multiple LED strings simultaneously, balancing circuitries 110, 120 must be inserted within the LED strings to regulate the current and absorb the voltage difference in each LED string, as shown in FIG. 1. The balancing circuitry can be passive or active. Active balancing circuitry includes switched current regulator [4]-[7], linear regulator, current mirror [8] and so on and these active balancing circuitry can be designed to achieve current balancing among all LED strings. Linear regulators and current mirrors are relatively simple and economical to implement, but the losses on the linear transistors are relatively high, making the linear regulators and current mirrors lossy. The switched current regulator uses high-frequency on-off switches to control current of each LED string with high efficiency. However, the switched mode circuit and the control logic are costly, complex and less reliable. Recently, some attempts have been made to improve the efficiency of linear schemes with the tradeoff of complex control [9]-[11].

In the passive balancing circuit, lossy resistors are not considered in high-power LED applications. The inductor and capacitor without real power dissipation are good candidates. Therefore, passive inductors or capacitors connected in series with the LED strings are used to achieve current balancing under certain circuit conditions. The AC currents from a pair of coupled inductors with 1:1 turns ratio [12] can balance the currents of two LED strings according to the principle of electromagnetic induction as shown in FIG. 2A. Alternatively, the AC currents from two complementary rectified current paths of an AC capacitor [13]-[16] can balance the currents of two LED strings according to the principle of capacitive charge balance, as shown in FIG. 2B. It should be noted that each LED string in capacitive charge balance shares the AC current alternatively for half a period by using two additional semi-controlled diodes. The coupled inductors and the capacitor within the charge balancing circuitry also act as voltage snubbers to absorb the voltage difference between two LED strings.

However, to achieve current balancing, inductors are coupled in pairs, limiting the scalability of the circuit. To balance currents for more LED strings, the number of coupled inductor will increase exponentially and the number of LED strings having balanced current must be an even number [17]-[19]. It has been previously proposed to reduce the number of coupled inductors with diploid relation to the number of LED strings and hence eliminate the strict requirement of an even number of balancing strings [20]. Capacitive charge balance also has similar limitation of only balancing an even number of LED strings. However, implementation of capacitive charge balance is complicated if the number of LED strings is more than two because every two LED strings need a capacitor and some fully controlled switches to facilitate the complementary conduction paths [21]. Generally, the inductive flux balance scheme suffers from low power density and high production cost compared to the capacitive scheme. The capacitive charge balance scheme is hard to implement for multiple LED strings. As an alternative, a hybrid structure with coupled inductor and blocking capacitor has been used [21], [22].

Unlike the balancing circuitries in FIGS. 2A and 2B, near identical current can be achieved by using a reactance in series with the resistive LED string [23], [24], provided that the reactance is sufficiently larger than the equivalent resistance of each LED string. The differences among the LED equivalent resistances can be neglected and a small current variation among LED strings can be guaranteed. However, direct driving this large reactance brings large reactive power, which will increase the volt-ampere (VA) rating and decrease the overall efficiency of the LED driver. Alternatively, the reactive loads can be driven indirectly with an opposite reactance to form a resonant tank. At the operating frequency, the impedance of the LED load can be compensated to be resistive for direct driving with minimal power stress. To supply the required current for the LED load, frequency control and/or pulse-width-modulation (PWM) control can be used. It is well known that LED has nonlinear characteristics and the equivalent resistance varies with driving current and junction temperature. Even when driven at a constant current, LED forward voltage still drifts nonlinearly with temperature. In some LED backlighting panels, the number of LEDs in one string is not fixed. The wide load range will widen the frequency variation and/or duty cycle variation, increase the reactive power, and make it difficult for converter optimization. A control using a hybrid of frequency modulation and PWM has been used to prevent the wide variations of these two control variables with improved performance [25]. However, the control is complex.

In summary, passive current balancing schemes adopting capacitors with high reliability, small size and low cost are very popular in many applications. However, the high reactive power of the capacitive balancing scheme with variable frequency control will bring high power stress on the VA rating of the main switches that drive this passive current balancing circuit and decrease the overall efficiency. Fixed frequency control does not permit zero-voltage switching (ZVS) under load variations. Hence, the present invention provides a simple, effective, and low-cost solution to the current balancing problem, which is a key problem in multi-string LED lighting systems.

SUMMARY OF THE INVENTION

Based on that a LED is driven by AC current, one aspect of the present invention is to connect a relatively large reactance to the LED string in series, thus forcing the voltage over the LED string to be comparatively small and insignificant. Another aspect of the present invention is to make sure that, based on voltage divider principle, the current through the LED is unaffected by its voltage-to-current characteristic because the large reactance has virtually taken an overwhelming portion. In one embodiment of the present invention, the reactance is provided by a small capacitor.

One aspect of the present invention includes a compensating inductance to cancel the capacitive reactance so that the input reactive power is still nearly zero. In one embodiment, the compensating inductance is a transformer providing isolation or wireless power transfer capability. Another aspect of the present invention is to use a full-bridge rectifier being fed from a DC voltage source as the input source. One further aspect of the present invention is to tune a small LC filter to the resonant frequency at which the input reactive power is nearly zero, and a special zero-voltage-switching condition can be achieved to maximize efficiency.

The present invention relates to a current-source-output LED driver based on a resonant circuit having a constant output current magnitude with simple control. In one embodiment, the resonant circuit is an LCLC filter circuit, which decouples the effect of load variation from the output current. In other words, the present invention provides an output constant current independent of variations in LED parameters. In one embodiment, the LCLC filter circuit is implemented with a capacitive balancing scheme to realize the current balancing for multiple LED strings. In another embodiment, the LCLC filter circuit is further implemented with zero input reactive power at the operating frequency. In a further embodiment, the LCLC filter circuit is implemented with duty cycle control at the operating frequency for the required current with zero-voltage switching (ZVS). In one embodiment, the current-source-output LED driver, as an output current source, is inherently LED-side short-circuit proof, and is designed with pulse-width-modulation (PWM) dimming. The present invention provides a scalable, simple, reliable, efficient and cost-effective constant current driver for balancing currents in multiple LED strings with wide forward voltage variations.

The present invention includes technical features such as paralleling any arbitrary number (scalable number) of series connections of capacitive reactance and LED string, and providing a resonant circuit that achieves reactive power cancellation, allows transformer isolation, and permits soft switching in the power converter at the same time. Other technical features of the present invention includes ability to operate at constant frequency, ability to make use of duty cycle control, ability to operate at practically zero reactive power processed by the active semiconductor with an appropriate parameter combination, ability to operate with soft-commutation (ZVS type), being short-circuit proof, and being scalable with an additional small capacitor for each additional LED string.

One advantage provided by the present invention is the reduction of cost of a LED driver. Another advantage is the effective current balancing. Another advantage still is the high efficiency by the use of capacitive reactance having very small loss. Furthermore, the present invention provides high compactness by use of capacitors instead of magnetic components. Other advantages include improved reliability, scalability, ease of operation and simple control.

One of the exemplary applications for the present invention is LED advertisement backlighting systems. More particularly, the present invention provides backlighting driven by a driver within a backlight panel without the need of binning similar property LEDs. Since unbinned LEDs are a lot less expensive than carefully binned LEDs, the present invention saves costs by enabling unbinned LEDs to be used in backlighting. The present invention has also been laboratory tested.

One aspect of the present invention relates to a driver for driving a plurality of LED strings with current balancing, comprising a T circuit comprising an input capacitor, a body inductor and a plurality of output capacitors; at least one full-wave rectifier connecting one of the plurality of output capacitors of the T circuit to an LED string; and at least one half-wave rectifier connecting one of the plurality of output capacitors of the T circuit to a pair of LED strings.

According to a further aspect of the present invention, the T circuit of the driver for driving a plurality of LED strings with current balancing further comprises an isolation transformer connected in parallel to the body inductor.

According to a further aspect of the present invention, the driver for driving a plurality of LED strings with current balancing further comprises a dimming switch connected in parallel to an LED string.

According to a further aspect of the present invention, the driver for driving a plurality of LED strings with current balancing further comprises a filter inductor connecting in series to the input capacitor of the T circuit. The filter inductor and the input capacitor of the T circuit are configured such that one or more high order harmonics of an AC input to the T circuit are filtered out.

According to a further aspect of the present invention, in the driver for driving a plurality of LED strings with current balancing, the output capacitor connected to the at least one half-wave rectifier is configured to have a capacitance twice as large as capacitance of the output capacitor connected to the at least one full-wave rectifier.

According to a further aspect of the present invention, the driver for driving a plurality of LED strings with current balancing further comprises a full-bridge circuit connected to the input capacitor of the T circuit.

Other aspects of the present invention are disclosed as illustrated by the embodiments hereinafter.

BRIEF DESCRIPTION OF THE DRAWINGS

Embodiments of the present invention will now be described solely by way of example in more detail hereinafter with reference to the accompanying drawings, in which.

DETAILED DESCRIPTION OF PREFERRED EMBODIMENTS

In the following description, the LCLC current-source-output multi-string LED drivers with capacitive current balancing are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

I. Led Driver According to an Embodiment of the Present Invention

A. LC Circuits with Constant Output Current and Zero Input Phase Angle

According to one embodiment of the present invention, the LED driver should operate as a constant current source independent of load variation to simplify the control. With the abundant supply of voltage source, a pure sinusoidal alternate current (AC) voltage driven LC circuits as shown in FIGS. 3A and 3B can facilitate the transformation of the AC voltage source $v_{IN}$ to an AC current source $i_{Oi}$ to drive the load $Z_i$, where i=1 or 2.

Figure 1:
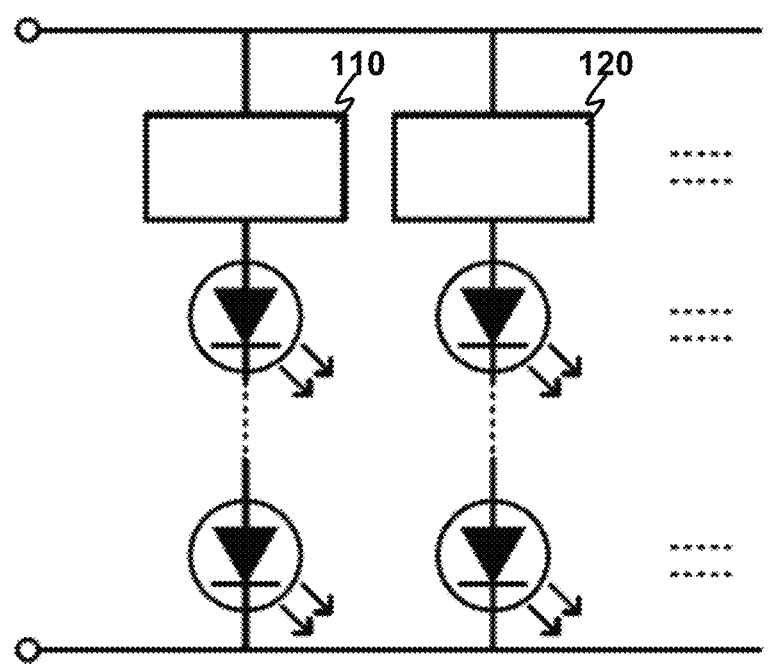
FIG. 1 is a circuit schematic showing an LED load with balancing circuitry for each LED string.
Figure 2A:
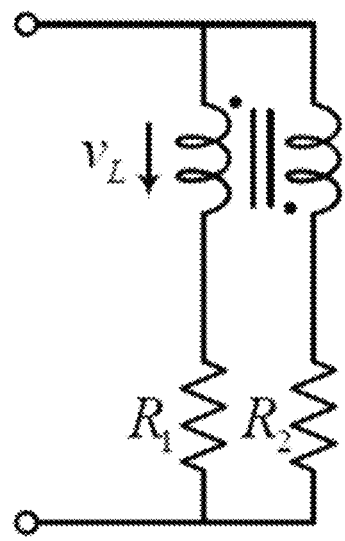
FIG. 2A is a circuit schematic of an inductive flux balance with two LED strings.
Figure 2B:
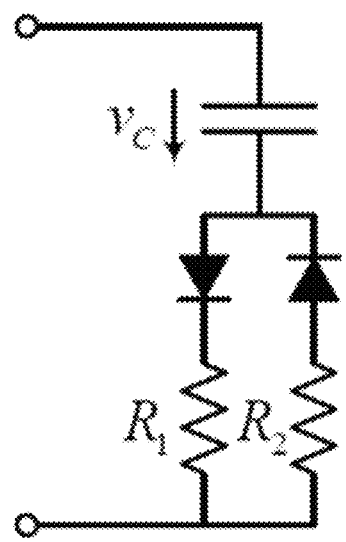
FIG. 2B is a circuit schematic of a capacitive charge balance with two LED strings.
Figure 3A:
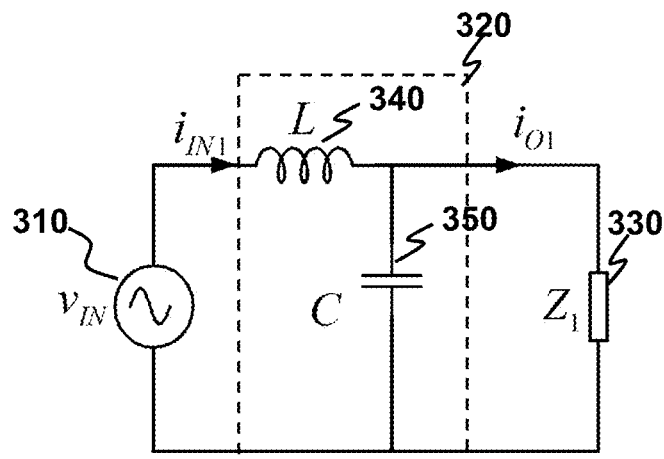
FIG. 3A is a circuit schematic including an inductive loop circuit.

The circuit as shown in FIG. 3A includes an inductive loop circuit 320. The inductive loop circuit 320 is an LC circuit including an inductor 340 and a capacitor 350. The inductive loop circuit 320 forms a first loop with the voltage source 310 by having the inductor 340 connected in series between the voltage source 310 and the capacitor 350. The inductive loop circuit 320 forms a second loop with the load 330 by having the inductor 340 connected in series between the voltage source 310 and the load 330.

Figure 3B:
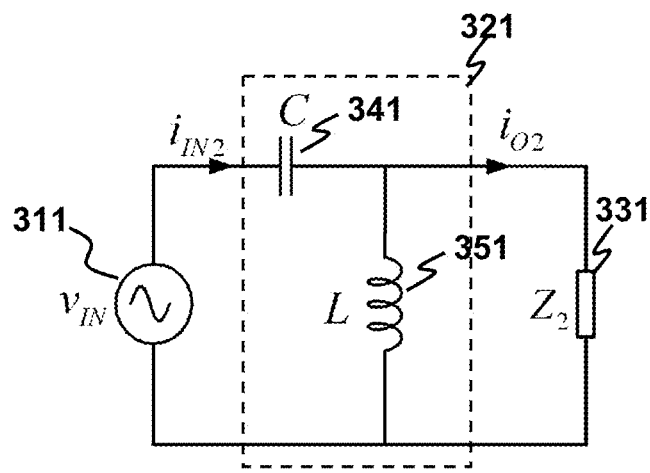
FIG. 3B is a circuit schematic including a capacitive loop circuit.

The circuit as shown in FIG. 3B includes a capacitive loop circuit 320. The capacitive loop circuit 321 is a LC circuit including a capacitor 341 and an inductor 351. The capacitive loop circuit 321 forms a first loop with the voltage source 311 by having the capacitor 341 connected in series between the voltage source 311 and the inductor 351. The capacitive loop circuit 321 forms a second loop with the load 331 by having the capacitor 341 connected in series between the voltage source 311 and the load 331.

According to frequency domain analysis of the circuits as shown in FIGS. 3A and 3B, when the AC voltage source $v_{IN}$ operates at $$f_r = \frac{1}{2\pi\sqrt{LC}},$$

the output current is a constant given by $$i_{O1} = -v_{IN} \cdot j\omega_r C \text{ and } i_{O2} = -\frac{v_{IN}}{j\omega_r L} \quad (1)$$

where $\omega_r = 2\pi f_r$.

Figure 3C:
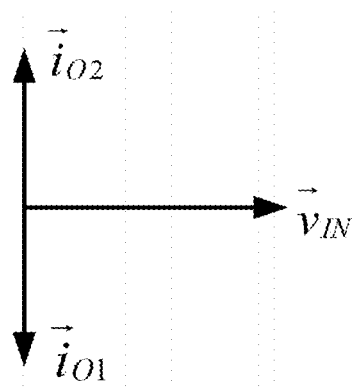
FIG. 3C is a vector diagram showing the vectors corresponding to the input voltage $\vec{v}_{IN}$ and the output currents $\vec{i}_{O1}$ and $\vec{i}_{O2}$ of the loop circuits in FIGS. 3A and 3B.

As indicated in FIG. 3C, $i_{O1}$ and $i_{O2}$ have the same magnitude and are out of phase that they are load independent. The loop circuits are inherently output short-circuit proof. However, output open-circuit is prohibited and an output open-circuit protection circuit should be implemented.

According to one embodiment of the present invention in light of practical implementation, the AC voltage source $v_{IN}$ 310, 311 is generated from a full-bridge or half-bridge switching circuit. The reactive power and circuit voltage-ampere (VA) rating of the switching circuit should be minimized. According to another effective embodiment, the input impedance of the reactive elements should be resistive. The input impedances of the two circuits as shown in FIGS. 3A and 3B are given by the following equations respectively:

For the circuit in FIG. 3A:

$$Z_{IN1} = \frac{v_{IN}}{i_{IN1}} = j\omega_r L + \frac{1}{j\omega_r C}\|Z_1 = \frac{\frac{L}{C}}{\frac{1}{j\omega_r C} + Z_1} \quad (2)$$

For the circuit in FIG. 3B:

$$Z_{IN2} = \frac{v_{IN}}{i_{IN2}} = \frac{1}{j\omega_r C} + j\omega_r L\|Z_2 = \frac{\frac{L}{C}}{\frac{1}{j\omega_r C} + Z_2} \quad (3)$$

The input impedances $Z_{IN1}$ and $Z_{IN2}$ are resistive if the load 330 $Z_1 = j\omega_r L$ in (2) and the load 331

$$Z_2 = \frac{1}{j\omega_r C} \text{ in (3).}$$

Figure 4A:
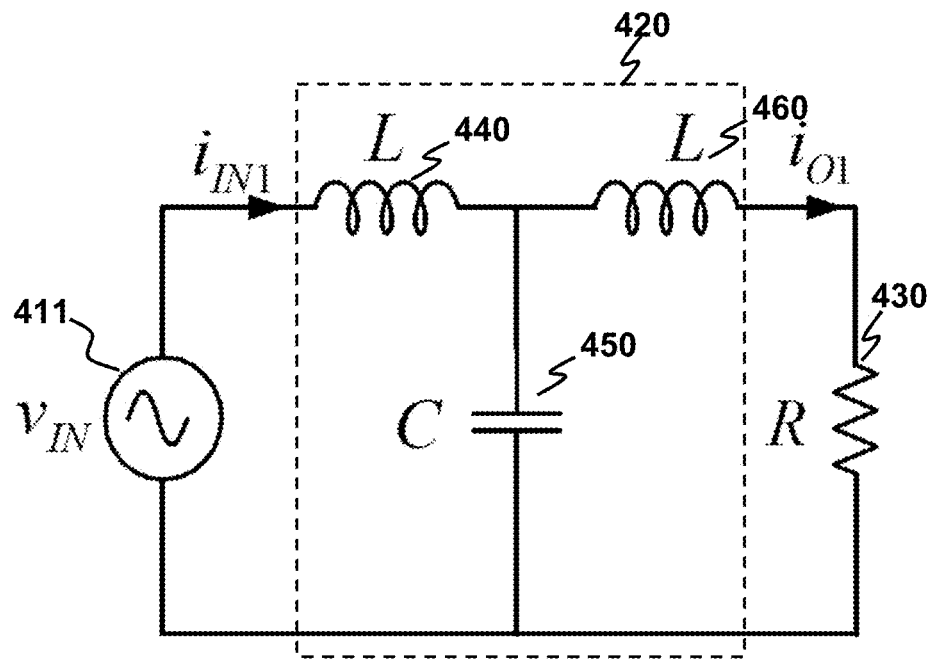
FIG. 4A is a circuit schematic of a LCL-T type circuit with constant output current and input ZPA.
Figure 4B:
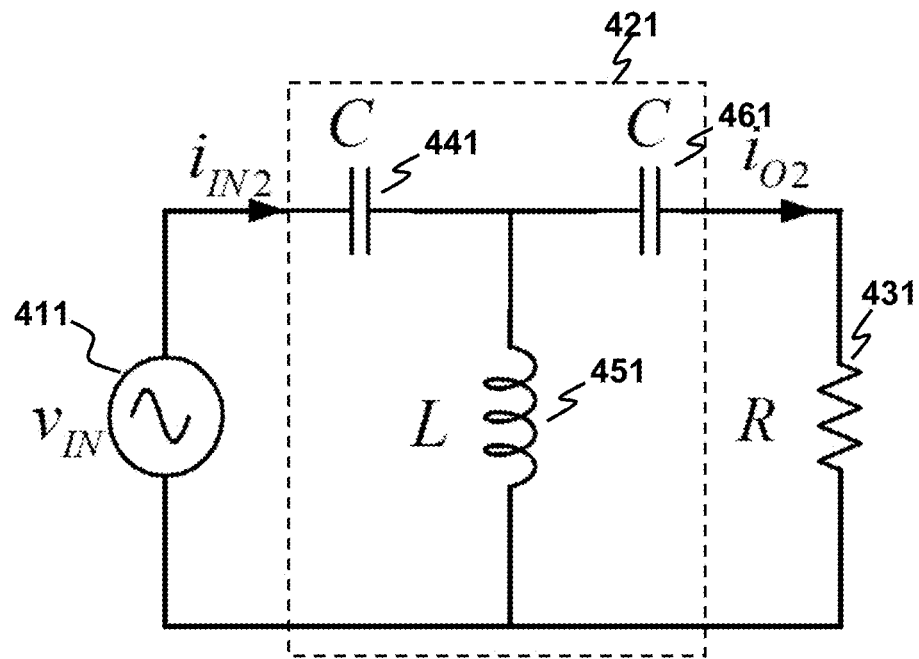
FIG. 4B is a circuit schematic of a CLC-T type circuit with constant output current and input ZPA.

Therefore, an additional inductive or capacitive component is added in each of these two loop circuits 320, 321 to realize the input zero-phase-angle (ZPA) and the loop circuits as shown in FIGS. 3A and 3B become the LCL-T and CLC-T circuits as shown in FIGS. 4A and 4B.

As a result, the input impedances in (2) and (3) become:

$$Z_{IN} = \frac{v_{IN}}{i_{IN1}} = \frac{v_{IN}}{i_{IN2}} = \frac{L}{RC} \quad (4)$$

B. Integration with Current Balancing Schemes

The LCL-T and CLC-T circuits as shown in FIGS. 4A and 4B operating at $f_r$ can output a constant AC current and can be driven with zero reactive power.

Figure 4C:
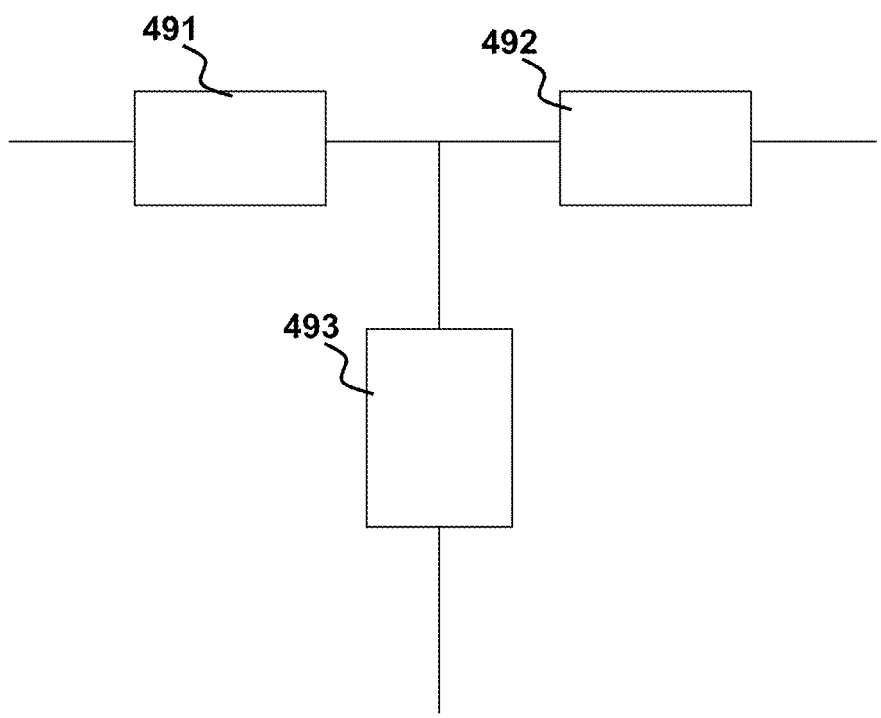
FIG. 4C is a block diagram illustrating a T circuit.

A T circuit can be a LCL-T circuit 420 as shown in FIG. 4A or a CLC-T circuit 421 as shown in FIG. 4B. FIG. 4C is a block diagram illustrating a T circuit. A T circuit is a T-shaped circuit with an input component 491 on one hand of the T circuit and an output component 492 on another hand of the T circuit. The body of the T circuit branching into two hands includes either a capacitor or an inductor as a body component 493.

The circuit as shown in FIG. 4A includes a LCL-T circuit 420 according to one embodiment of the present invention. The LCL-T circuit 420 is a circuit including an input inductor 440 on one hand of the LCL-T circuit 420, an output inductor 460 on another hand of the LCL-T circuit 420 and a body capacitor 450 along the body of the LCL-T circuit 420. Each of the two inductors 440, 460 has one end connected to one end of the body capacitor 450. The input inductor 440, the output inductor 460 and the body capacitor 450 join one another at one single junction. After having one end connected to the body capacitor 450, the free end of the input inductor 440 is connected to the voltage source 410 and the free end of the output inductor 460 is connected to the load 430. The LCL-T circuit 420 forms a first loop with the voltage source 410 by having the input inductor 440 connected in series between the voltage source 410 and the body capacitor 450. The LCL-T circuit 420 forms a second loop with the load 430 by having the two inductors 440, 460 connected in series between the voltage source 410 and the load 430.

The circuit as shown in FIG. 4B includes a CLC-T circuit 420 according to one embodiment of the present invention. The CLC-T circuit 421 is a circuit including an input capacitor 441, and output 461 and a body inductor 451. Each of the two capacitors 441, 461 has one end connected to one end of the body inductor 451. The input capacitor 441, the output capacitor 461 and the body inductor 451 join one another at one single junction. After having one end connected to the body inductor 451, the free end of the input capacitor 441 is connected to the voltage source 411 and the free end of the output capacitor 461 is connected to the load 431. The CLC-T circuit 421 forms a first loop with the voltage source 411 by having the input capacitor 441 connected in series between the voltage source 411 and the body inductor 451. The CLC-T circuit 421 forms a second loop with the load 431 by having the two capacitors 441, 461 connected in series between the voltage source 411 and the load 431.

Each LED string driven by one of these two circuits with the same parameters has nearly identical current. In [26], multiple LCL-T circuits are used and connected to a common AC line to realize the current balancing for multiple LED strings. One LED string requires an LCL-T circuit, which is easy for a modular design. However, the component tolerances of the LCL-T circuit affect the accuracy of the output current for each LED string and the power density with each LED string having an LCL-T module is relatively low.

To improve the current balancing performance and power density, current balancing according to an embodiment of the present invention is implemented by integrating the large reactance balancing schemes within the LCL-T and CLC-T circuits. The basic concept is to duplicate the output inductor or capacitor with LED strings in the LC tank, but keeping the overall reactance the same, as shown in FIGS. 5A and 5B.

Figure 5A:
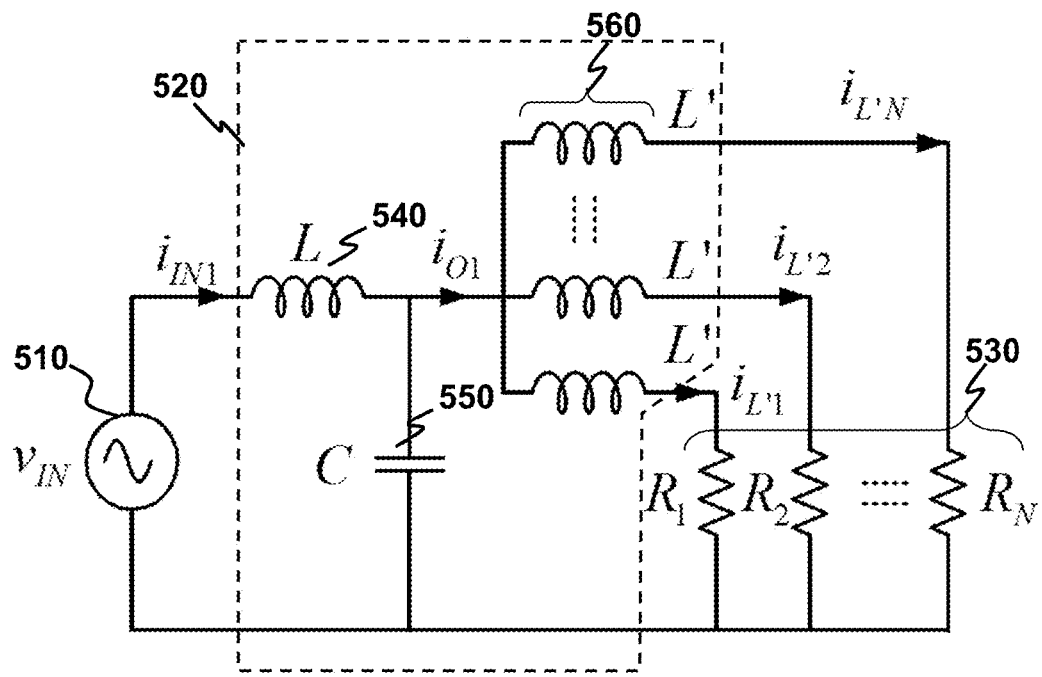
FIG. 5A is a circuit schematic of a LCL-T type circuit with constant output current, input ZPA and reactive current balancing scheme.

FIG. 5A is a circuit schematic of a LCL-T type circuit with constant output current, input ZPA and reactive current balancing scheme. The circuit as shown in FIG. 5A includes a LCL-T circuit 520 according to one embodiment of the present invention. The LCL-T circuit 520 is a circuit including an input inductor 540, a plurality of output inductors 560 as an output component and a body capacitor 550. The input inductor 540 has one end connected to one end of the body capacitor 550. Each of the plurality of output inductors 560 has one end connected to one end of the body capacitor 550. The input inductor 540, the plurality of output inductors 560 and the body capacitor 550 join one another at one single junction. After having one end connected to the body capacitor 550, the free end of the input inductor 540 is connected to the voltage source 510 and the free end of each of the plurality of the output inductors 560 is connected to one of the multi-string LED loads 530. The LCL-T circuit 520 forms a first loop with the voltage source 510 by having the input inductor 540 connected in series between the voltage source 510 and the body capacitor 550. The LCL-T circuit 520 forms a second loop with each of the multi-string LED loads 530 by having the input inductor 540 and one of the plurality of output inductors 560 connected in series between the voltage source 510 and each of the multi-string LED loads 530.

Figure 5B:
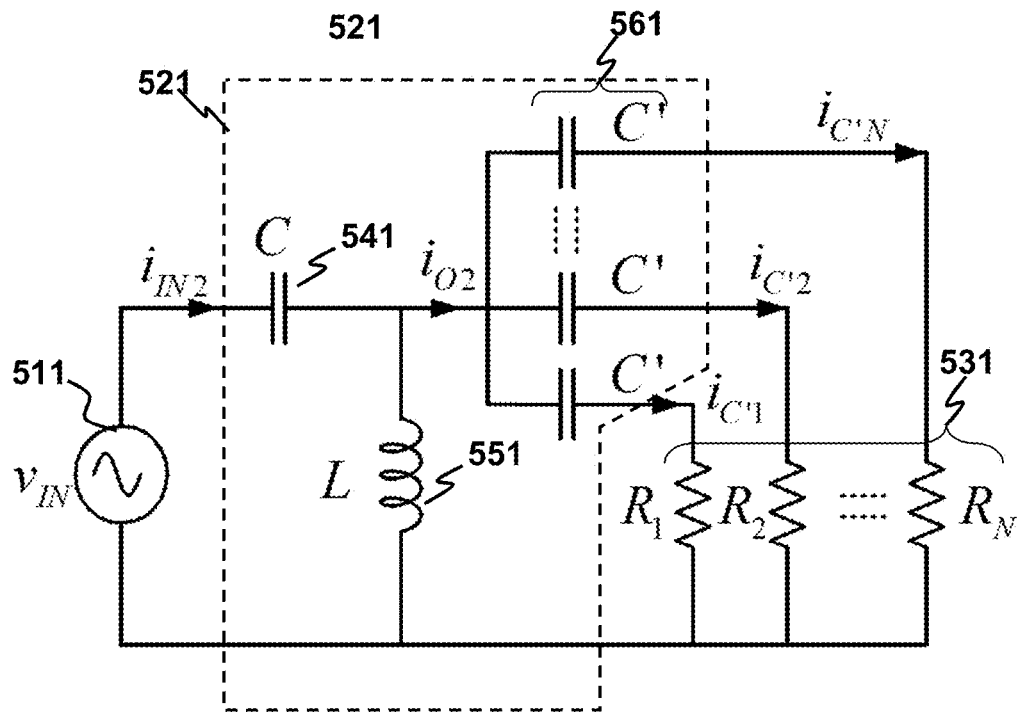
FIG. 5B is a circuit schematic of a CLC-T type circuit with constant output current, input ZPA and reactive current balancing scheme.

FIG. 5B is a circuit schematic of a CLC-T type circuit with constant output current, input ZPA and reactive current balancing scheme. The circuit as shown in FIG. 5B includes a CLC-T circuit 521 according to one embodiment of the present invention. The CLC-T circuit 521 is a circuit including an input capacitor 541, a body inductor 551 and a plurality of output capacitors 561 as an output component. The input capacitor 541 has one end connected to one end of the body inductor 551. Each of the plurality of output capacitors 561 has one end connected to one end of the body inductor 551. The input capacitor 541, the plurality of output capacitors 561 and the body inductor 551 join one another at one single junction. After having one end connected to the body inductor 551, the free end of the input capacitor 541 is connected to the voltage source 511 and the free end of each of the plurality of output capacitors 561 is connected to one of the multi-string LED loads 531. The CLC-T circuit 521 forms a first loop with the voltage source 511 by having the input capacitor 541 connected in series between the voltage source 511 and the body inductor 551. The CLC-T circuit 521 forms a second loop with each of the multi-string LED loads 531 by having the input capacitor 541 and one of the plurality of output capacitors 561 connected in series between the voltage source 511 and each of the multi-string LED loads 531.

With a much larger reactance of L' or C' than the equivalent LED string loading resistance $R_m$, m∈1, 2, . . . , N, each LED string connected with the same L' or C' can equally share the constant output current $i_{O1}$ or $i_{O2}$. To ensure ZPA, the overall reactance should be equal to that as in FIGS. 4A and 4B, i.e., $$L' = NL, \text{ and } C' = \frac{C}{N} \quad (5)$$

$$i_{L'1} = i_{L'2} = \ldots = i_{L'N} = \frac{i_{O1}}{N} \quad (6)$$

$$i_{C'1} = i_{C'2} = \ldots = i_{C'N} = \frac{i_{O2}}{N} \quad (7)$$

Here, N can be odd or even.

Compared with the current balancing scheme in [26], the improved current balancing scheme based on an LCL-T or CLC-T circuit provided by the present invention only needs one pair of LC or CL and N balancing inductors or capacitors to realize N balanced and constant LED current, which saves N−1 pairs of LC or CL. The accuracy of current balance is affected only by the tolerances of N balancing inductors or capacitors.

The tolerance distribution of inductors is determined by the production process. An LCL-T circuit with N larger inductors L' will decrease the power density and increase the production cost. The use of coupled inductors will face the original problem of inductive flux balance. Therefore, rather than the LCL-T circuit, the CLC-T circuit is a preferred embodiment for the present invention and will be adopted for the subsequent development for an illustration purposes.

The tolerance of film capacitors is normally ±5%. As the total output current $i_{O2}$ is determined by the leading CL impedances, the tolerances of balancing capacitors and load resistors will not affect the accuracy of $i_{O2}$. Assuming the tolerance of $C_p'$ is $\alpha_p$, where the subscript p∈{1, 2, . . . , N} denotes the index of LED strings, the total output current $i_{O2}$ is given by:

$$C_p' = C'(1 + \alpha_p) \quad (8)$$

$$i_{C'1} \cdot \frac{1}{j\omega_r C_1'} = i_{C'2} \cdot \frac{1}{j\omega_r C_2'} = \ldots = i_{C'N} \frac{1}{j\omega_r C_N'} \quad (9)$$

$$i_{O2} = i_{C'1} + i_{C'2} + \ldots + i_{C'N} \quad (10)$$

The current deviation can be calculated by $d_p$ $$d_p = \frac{\left|i_{C'p} - \frac{i_{O2}}{N}\right|}{\frac{i_{O2}}{N}} = \frac{\left|N\alpha_p - \sum_{i=1}^{N} \alpha_i\right|}{N + \sum_{i=1}^{N} \alpha_i} \quad (11)$$

Figure 6:
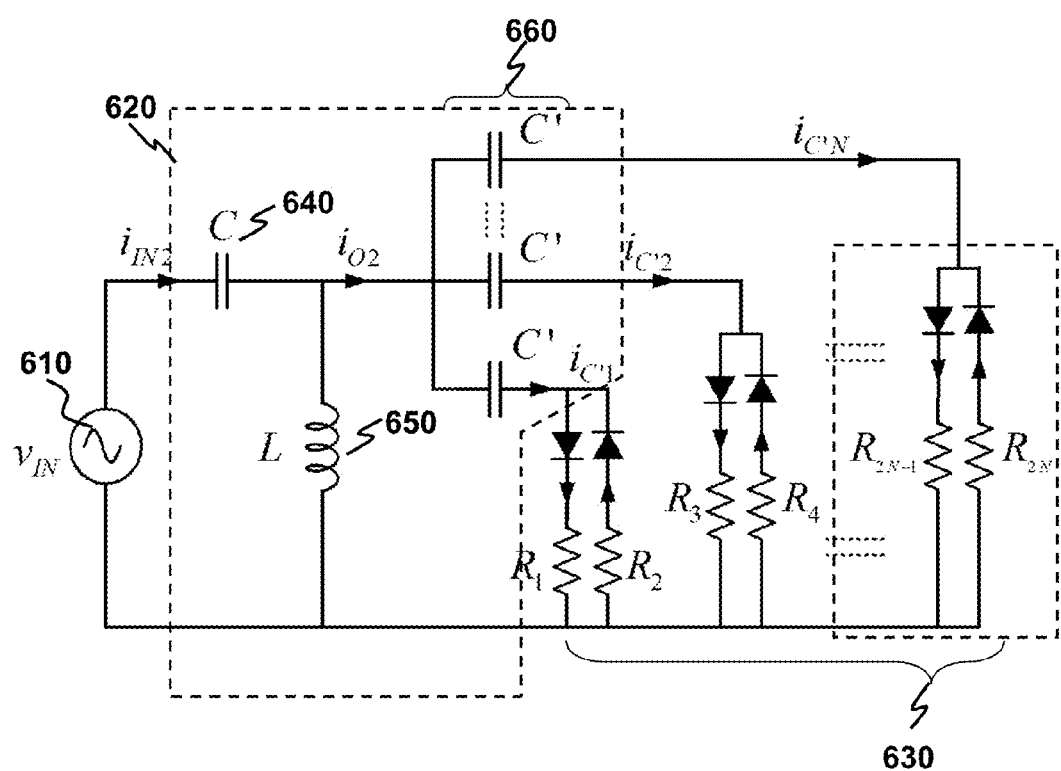
FIG. 6 is a circuit schematic of an improved CLC-T type circuit of FIG. 5B with capacitive charge balance scheme for 2N LED strings.

Besides the integration with reactive current balancing, the CLC-T circuit with N capacitors C' can be easily realized with current balancing in 2N LED strings by further incorporating the charge balance scheme in FIG. 6. Diodes are needed to ensure two LED strings connected with a capacitor conducting alternatively for half a period.

FIG. 6 is a circuit schematic of an improved CLC-T type circuit of FIG. 5B with capacitive charge balance scheme for 2N LED strings. The circuit as shown in FIG. 6 includes a CLC-T circuit 620 according to one embodiment of the present invention. The CLC-T circuit 620 is a circuit including an input capacitor 640, a body inductor 650 and a plurality of output capacitors 660. The input capacitor 640 has one end connected to one end of the body inductor 650. Each of the plurality of output capacitors 660 has one end connected to one end of the body inductor 650. The input capacitor 640, the plurality of output capacitors 660 and the body inductor 650 join one another at one single junction. After having one end connected to the body inductor 650, the free end of the input capacitor 640 is connected to the voltage source 610 and the free end of each of the plurality of output capacitors 660 is connected to one of the multi-string LED loads 630. Each of the multi-string LED loads 630 consists of two LED strings connected in parallel and each LED string includes a diode. In one of the multi-string LED loads 630, one diode is connected in series in an LED string in a forward direction and the other diode is connected in series in the other LED string in a backward direction. The CLC-T circuit 620 forms a first loop with the voltage source 610 by having the input capacitor 640 connected in series between the voltage source 610 and the body inductor 650. The CLC-T circuit 620 forms a second loop with each of the multi-string LED loads 630 by having the input capacitor 640 and one of the plurality of output capacitors 660 connected in series between the voltage source 610 and each of the multi-string LED loads 630.

II. Circuit Design, Control, and Implementation

The improved CLC-T circuit combined with the reactive current balancing scheme in FIG. 5B features constant output current, zero input reactive power and output current balancing for arbitrary resistances of LED load strings. If the number of load strings is even, the further improved CLC-T circuit shown in FIG. 6 combining capacitive charge balancing can save half the number of balancing capacitors. However, the design is different from that in FIG. 5B.

Considering the unidirectional conduction of LED loads, a rectifier and a low-pass filter are needed to provide the required DC current. A full-wave rectifier and a half-wave rectifier should be used here. In FIG. 6, half-wave rectifiers are used for the number of LED strings twice that of the charge balancing capacitors.

Figure 7:
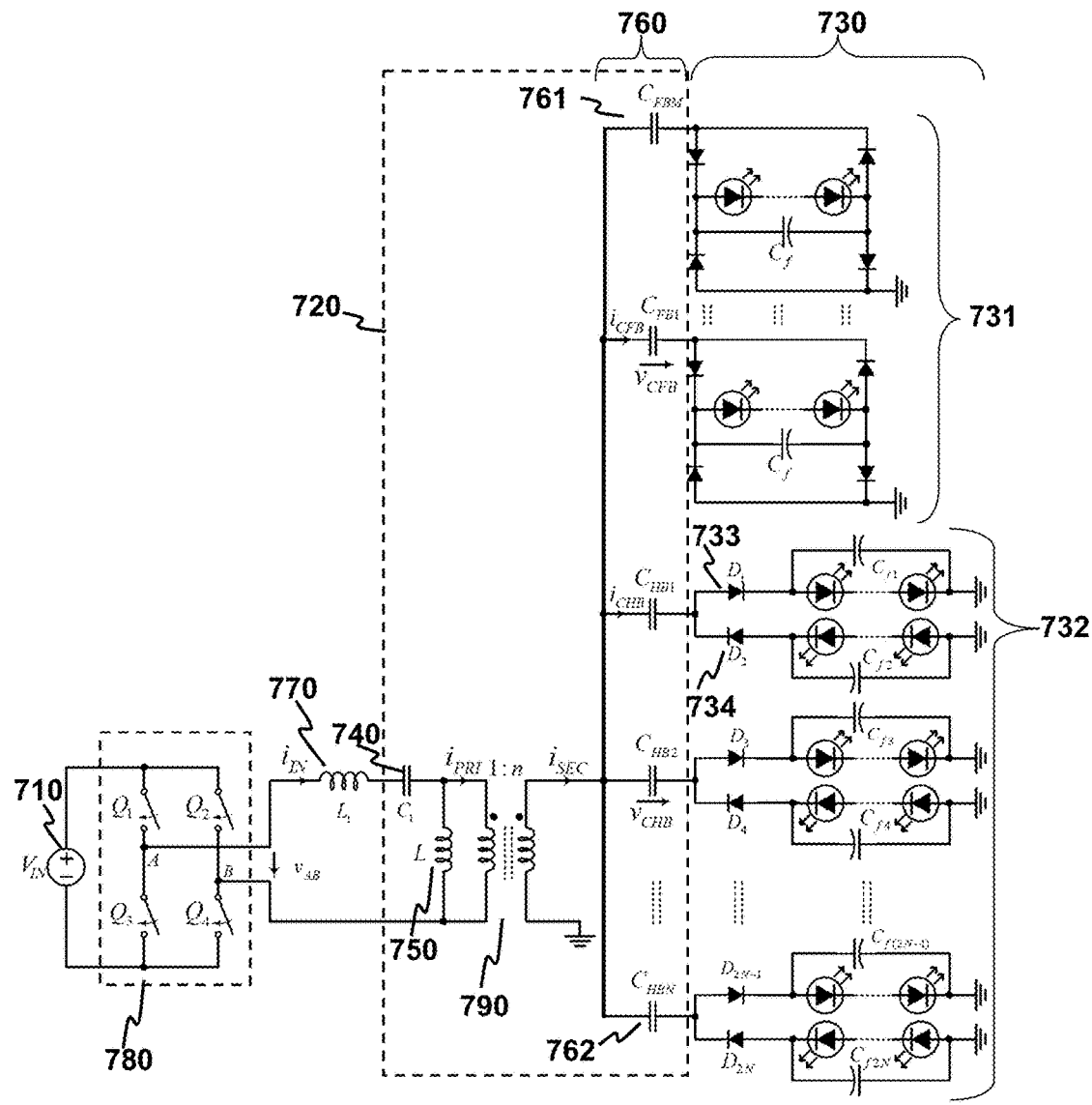
FIG. 7 is a circuit schematic of an LED driver based on an improved LCLC filter circuit with current balancing for (2N+M) LED strings.

FIG. 7 is a circuit schematic of an LED driver based on an improved LCLC filter circuit with current balancing for (2N+M) LED strings. FIG. 7 gives a hybrid structure with (2N+M) LED strings for different optimized applications, where N and M can be odd or even. The input AC voltage $v_{AB}$ is generated from a full-bridge circuit 780 with an input DC voltage $V_{IN}$, and $|v_{AB}|$ is modulated by the duty cycle D of the full-bridge circuit 780.

The circuit as shown in FIG. 7 includes a CLC-T circuit 720 according to one embodiment of the present invention. The circuit as shown in FIG. 7 includes a CLC-T circuit 720 according to one embodiment of the present invention. The CLC-T circuit 720 is a circuit including an input capacitor 740, a body inductor 750 and a plurality of output capacitors 760. The body inductor 750 can be internal to, as a magnetizing inductor of, an isolation transformer 790. It is, however, optional that body inductor 750 being an external inductor for compensating insufficient inductance provided by the magnetizing inductor of the isolation transformer 790. The input capacitor 740 has one end connected to one end of the body inductor 750. Each of the plurality of output capacitors 760 has one end connected to one end of the body inductor 750. The input capacitor 740, the plurality of output capacitors 760 and the body inductor 750 join one another at one single junction. After having one end connected to the body inductor 750, the free end of the input capacitor 740 is connected to the voltage source 710 and the free end of each of the plurality of output capacitors 760 is connected to one of the multi-string LED loads 730.

The CLC-T circuit 720 further includes N half-wave rectifiers 732. The input of each of the N half-wave rectifiers 732 is connected to one of the plurality of output capacitors 760. The output of each of the N half-wave rectifiers 732 is connected to a pair of LED strings. Each of the N half-wave rectifiers 732 has an input diode 733 connected in series to one of the pair of LED strings. Each of the N half-wave rectifiers 732 has a feedback diode 734 connected in series to another one of the pair of LED strings. The current flow through the input diode 733 is from the input of the half-wave rectifier to the LED string and is opposite to the current flow through the output diode 734, which is from the LED string to the input of the half-wave rectifier.

The CLC-T circuit 720 further includes M full-wave rectifiers 731. The input of each of the M full-wave rectifiers 731 is connected to one of the plurality of output capacitors 760 of the CLC-T circuit 720. The output of each of the M full-wave rectifiers 731 is connected to an LED string.

The CLC-T circuit 720 forms a first loop with the voltage source 710 by having the input capacitor 740 connected in series between the voltage source 710 and the body inductor 750. The CLC-T circuit 720 forms a second loop with each of the multi-string LED loads 730 by having the input capacitor 740 and one of the plurality of output capacitors 760 connected in series between the voltage source 710 and each of the multi-string LED loads 730.

An isolation transformer 790 for safety can be incorporated into the CLC circuit as shown in FIG. 7. To achieve an accurate output constant current, the high order harmonics of $v_{AB}$ should be filtered. Essentially, the LCLC series-parallel resonant network has a good input higher harmonics filtering performance [27]. A filter inductor 770 in series with a $C_1$ modified from the original C as shown in FIG. 7 is used for the harmonic filtering and the retention of constant output current, input ZPA and reactive current balancing scheme.

A. Selection of Balancing Capacitor

Figure 8A:
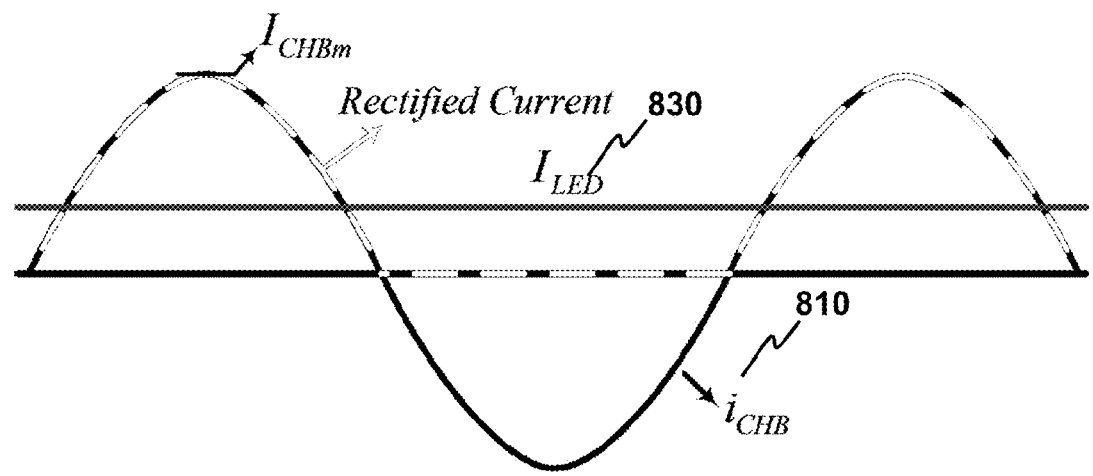
FIG. 8A is a diagram showing the current waveforms of the balancing capacitor and the averaged current of LED string of a half-wave rectifier.
Figure 8B:
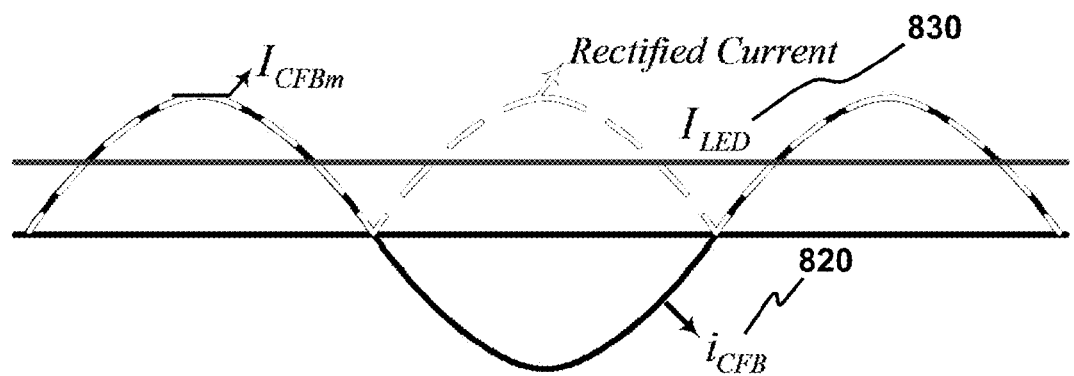
FIG. 8B is a diagram showing the current waveforms of the balancing capacitor and the averaged current of LED string of a full-wave rectifier.

FIG. 7 uses N half-wave rectifiers and M full-wave rectifiers 731 to balance (2N+M) LED strings. Assume a nominal current of $I_{LED}$ in each LED string. In order to balance the respective 2N and M LED strings, it is required $C_{HB1}=C_{HB2}= \ldots =C_{HBN}=C_{HB}$ and $C_{FB1}=C_{FB2}= \ldots =C_{FBM}=C_{FB}$. In other words, each of the output capacitors 762 connecting to one of the half-wave rectifiers 732 has the same capacitance and each of the output capacitors 761 connecting to one of the full-wave rectifiers 731 has the same capacitance. Based on the current waveforms of capacitor currents $i_{CHB}$ 810 and $i_{CFB}$ 820 drawn in FIGS. 8A and 8B, the averaged current $I_{LED}$ 830 can be determined as:

$$I_{LED} = \frac{1}{\pi}I_{CHB_m}, \text{ and } I_{LED} = \frac{2}{\pi}I_{CFB_m} \qquad (12)$$

Thus, the peak current $I_{CHB_m}=2I_{CFB_m}=I_m=\pi I_{LED}$. With the nearly identical voltage of capacitor strings, the capacitances of $C_{HB}$ and $C_{FB}$ should satisfy $$C_{FB} = \frac{C_{HB}}{2} \qquad (13)$$

In other words, the capacitance of the output capacitor 762 connecting to one of the half-wave rectifiers 732 is twice as large as the capacitance of the output capacitor 761 connecting to one of the full-wave rectifiers 731.

To achieve good current balancing performance, $$X_{CHB} = \frac{1}{\omega C_{HB}} \gg \frac{4R_{STR_i}}{\pi^2}$$

where $i \in \{1, 2, \ldots, N\}$ and $$X_{CFB} = \frac{1}{\omega C_{FB}} \gg \frac{8R_{STR_k}}{\pi^2}$$

where $k \in \{1, 2, \ldots, M\}$. Substituting (13) into these two equations, the reactance $X_{CHB}$ becomes:

$$X_{CHB} = \frac{1}{\omega C_{HB}} \gg \frac{4R_{STRi}}{\pi^2}, \text{ and } i \in \{1, 2, \ldots, (2N+M)\} \qquad (14)$$

To realize ZPA, the equivalent capacitance $C_{eq}$ of the capacitor strings, i.e. the plurality of the output capacitors 760, should satisfy (5) at the primary coil of the isolation transformer 790. So, $$C_{eq} = \left(N + \frac{M}{2}\right)C_{HB}, \text{ and} \qquad (15)$$

$$\omega = 2\pi f_S = \frac{1}{\sqrt{n^2 L C_{eq}}} \qquad (16)$$

where the transformer turns ratio of the isolation transformer 790 is 1:n and $f_s$ is the switching frequency of the full-bridge 710 with switches $Q_{1,2,3,4}$.

Simplifying (15) and (16), the following equation is obtained:

$$C_{HB} = \frac{1}{4\pi^2 f_s^2 n^2 \left(N + \frac{M}{2}\right)} \cdot \frac{1}{L} \quad (17)$$

The voltage stresses of $C_{HB}$ and $C_{FB}$ are close but different. As the output capacitor 762 connecting to the half-wave rectifier 732 $C_{HB}$ serves the purposes of both reactive current balancing and charge balancing, it suffers from the AC voltage stress and the bias DC voltage stress between two anti-paralleled LED resistances. The output capacitor 761 connecting to the full-wave rectifier 731 $C_{FB}$ only suffers from the AC voltage stress. As the LED resistance is much smaller than the reactance of the balancing capacitor, the DC bias is much smaller than the AC voltage. The capacitor voltage stresses are given as follows:

$$V_{CFB} = I_{CFB_m} \cdot \frac{1}{\omega C_{FB}} = \frac{\pi I_{LED}}{\omega C_{FB}} = \frac{2\pi I_{LED}}{\omega C_{HB}} \quad (18)$$

$$V_{CHB} = I_{CHB_m} \cdot \frac{1}{\omega C_{HB}} + \frac{|R_{STR(2i)} - R_{STR(2i-1)}|}{2} \cdot I_{LED} \quad (19)$$

$$= I_{LED}\left(\frac{2\pi}{\omega C_{HB}} + \frac{|R_{STR(2i)} - R_{STR(2i-1)}|}{2}\right)$$

where $i \in \{1, 2, \ldots, N\}$.

B. Output Current and Control Scheme

The current of each capacitor string is in phase so that the total current in the isolation transformer's 790 secondary current $$I_{SEC}(t) = \left(N + \frac{M}{2}\right) \cdot I_{CHB}(t)$$

and the peak current is:

$$I_{SEC_m} = \left(N + \frac{M}{2}\right) I_{CHB_m} = \left(N + \frac{M}{2}\right) \pi I_{LED} \quad (20)$$

The reflected primary current in the isolation transformer 790 is given as $$i_{PRI} = n \cdot i_{SEC} \text{ and } I_{PRI_m} = n I_{SEC_m} \quad (21)$$

Figure 9A:
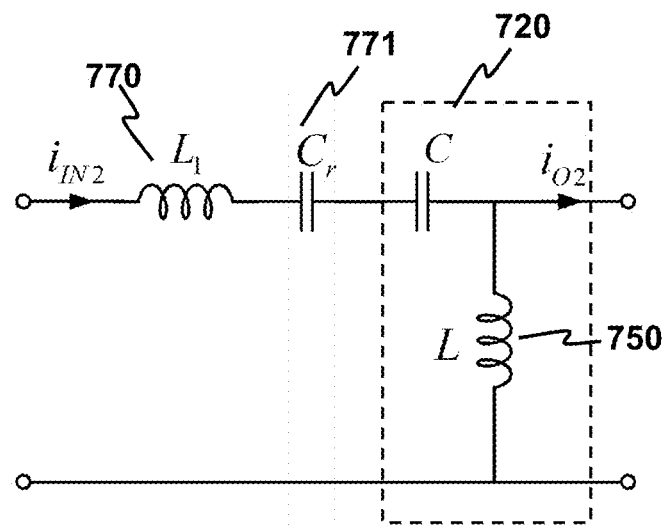
FIG. 9A is a circuit schematic of the derivation of LCLC circuit from FIG. 5B by adding $L_1$ and $C_r$.
Figure 9B:
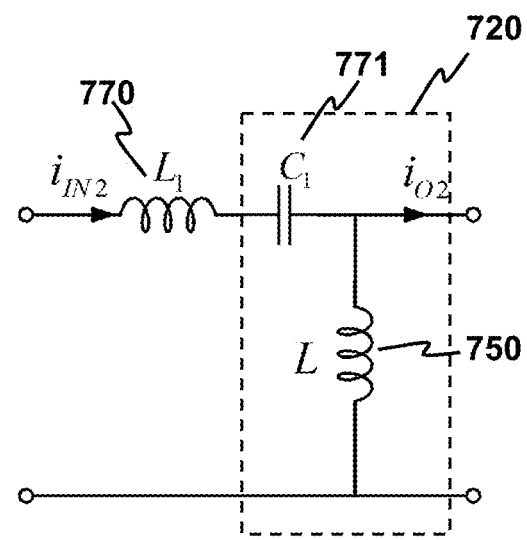
FIG. 9B is a circuit schematic of the derivation of LCLC circuit from FIG. 5B by adding $C_r$ and C are combined into $C_1$.

In FIGS. 5B, L and C resonate at $f_s$ with constant output current and input ZPA. Here, for the purpose of higher harmonics filtering, the filter inductor 770 $L_1$ and the filter capacitor 771 $C_r$ are added in-front of the CLC-T circuit of the circuit in FIG. 7 and the enlarged view of the relevant part of the circuit in FIG. 7 is shown in FIG. 9A. As filter inductor 770 $L_1$ and the filter capacitor 771 $C_r$ are designed to resonate at $f_s$ as shown in FIG. 9A, it has zero impedance at $f_s$. The circuit is reduced to FIG. 5B at $f_s$. Combining the filter capacitor 771 $C_r$ and the input capacitor C of the CLC-T circuit 720 to become an resultant capacitor 771 $C_1$ as shown in FIG. 9B, the resultant capacitance 771 $C_1$ will be given by:

$$C_1 = \frac{C_r C}{C_r + C}, \text{ and} \quad (22)$$

$$\omega = 2\pi f_s = \frac{1}{\sqrt{LC}} = \frac{1}{\sqrt{L_1 C_r}} \quad (23)$$

Substituting (23) into (22), the following is obtained:

$$\omega = 2\pi f_s = \frac{1}{\sqrt{(L + L_1)C_1}} \quad (24)$$

where L determines the output current and $L_1 C_1$ are used to filter out the high order harmonics of the PWM modulated voltage $v_{AB}$. With sufficiently large $L_1$ and $C_1$, only the AC fundamental voltage $v_{IN}$ of $v_{AB}$ remains.

$$v_{IN}(t) = \frac{4V_{IN}}{\pi} \sin\frac{\pi D}{2} \sin(\omega t + \theta) \quad (25)$$

The output current at the primary coil of the isolation transformer 790 is $$i_{PRI} = \frac{v_{IN}}{j\omega L} \quad (26)$$

Substituting (25) and (26) into (21), the following is obtained:

$$L = \frac{2V_{IN}\sin\frac{\pi D}{2}}{\pi^3 f_s n \left(N + \frac{M}{2}\right) I_{LED}} \quad (27)$$

Choosing sufficiently large $L_1$, $C_1$ can be calculated by (24). Here, $L_1$ is usually designed a bit larger than that in (24) to permit ZVS of power switches. With L in (27), the capacitance of the output capacitor 762 connecting to one of the half-wave rectifiers 732 $C_{HB}$ in (17) will become:

$$C_{HB} = \frac{\pi I_{LED}}{8 f_s n V_{IN} \sin\frac{\pi D}{2}} \quad (28)$$

From the above design, fixed frequency duty cycle control can be easily implemented by sensing only one LED string current for feedback control. The output capacitor 762 connecting to one of the half-wave rectifiers 732 $C_{HB}$ and the output capacitor 761 connecting to one of the full-wave rectifiers 731 $C_{FB}$ make sure the other strings having the same currents. Some commercial ICs such as UCC3895 will facilitate the control logic. With the component tolerances, the output current error is small and the variation of duty cycle can be small, and hence does not affect the realization of ZVS of the power switches.

C. Dimming and Protection

In the current balancing scheme according to the present invention, 2N LED strings are driven by a half-wave rectified sinusoidal current at $f_s$ and M LED strings are driven by a full-wave rectified sinusoidal current at $2f_s$. These pulsing currents are filtered by a filtering capacitor $C_f$ to generate an average current $I_{avg}$ superimposed with a peak-to-peak current of $2\Delta I_{avg}$. The time constant of the parallel connected $C_f$ and LED string is determined by the product of the LED inner dynamic resistance $R_{dyn}$ and $C_f$.

Usually, $R_{dyn}$ can be as small as several ohms. The capacitor $C_f$ will absorb the extra charge of the rectified current above $I_{avg}$. An integration of the current for the total charge Q above $I_{avg}$ within a current pulse period gives the magnitude $$\Delta v_{C_f} = \frac{Q}{C_f}$$

of the increased capacitor voltage above the averaged capacitor voltage. The ripple current magnitude $\Delta I_{avg}$ can be estimated by $$\frac{\Delta v_{C_f}}{R_{dyn}}.$$

For full-bridge rectification, and using (12), the following will be obtained:

$$i_{CFB}(t) = \frac{\pi}{2} I_{CFBm} \sin\omega t - I_{avgFB}, \text{ and} \quad (29)$$

$$r_{FB} = \frac{\Delta I_{avgFB}}{I_{avgFB}} = \frac{\pi\cos\left(\sin^{-1}\frac{2}{\pi}\right) - \left(\pi - 2\sin^{-1}\frac{2}{\pi}\right)}{2\omega C_f R_{dyn}} = \frac{0.053}{f_s C_f R_{dyn}}$$

For half-bridge rectification, the following will be obtained:

$$i_{CHB}(t) = \pi I_{CHBm} \sin\omega t - I_{avgHB}, \text{ and} \quad (31)$$

$$r_{HB} = \frac{\Delta I_{avgHB}}{I_{avgHB}} = \frac{2\pi\cos\left(\sin^{-1}\frac{1}{\pi}\right) - \left(\pi - 2\sin^{-1}\frac{1}{\pi}\right)}{2\omega C_f R_{dyn}}$$
$$= \frac{0.276}{f_s C_f R_{dyn}}$$

The minimum filtering capacitance $C_{f,min}$ can thus be determined by the maximum allowable current ripple factor given by either (30) or (32).

Figure 10:
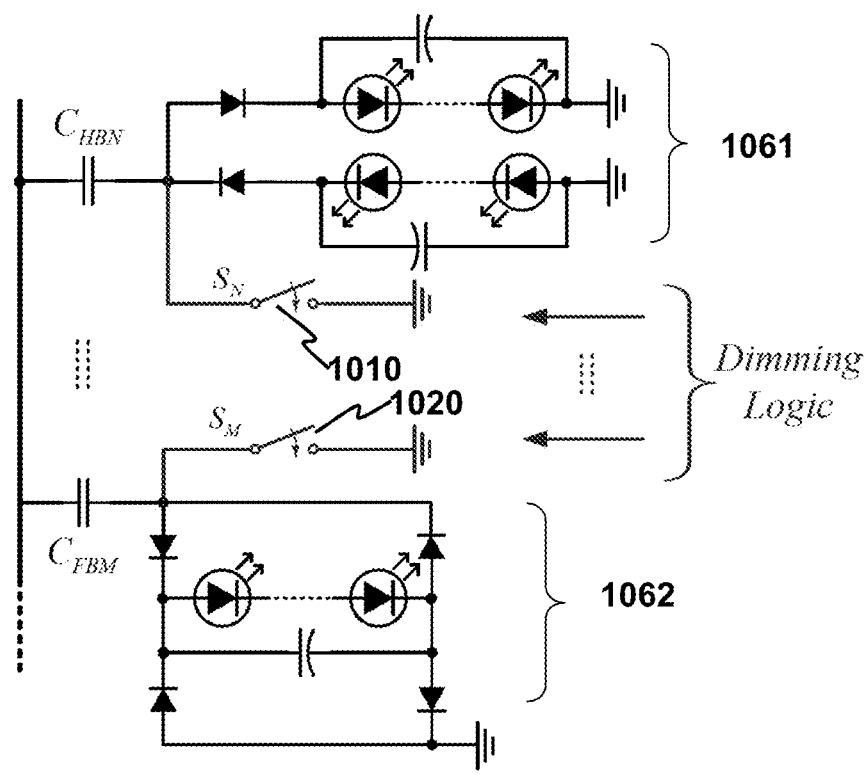
FIG. 10 is a circuit schematic of LED strings with dimming switches and control logic.

PWM dimming is a better dimming method for LEDs because of simplicity and is used as a preferred embodiment of the present invention. The proposed LED driver can provide an output current source for each LED string. When some LEDs or one LED string is shorted, the equivalent LED string resistance $R_{STR}$ becomes small or even zero. The reactance of the balancing capacitor dominates the output current so that current balancing is still operative. However, when one LED is damaged such that the LED string is open, $R_{STR}$ becomes very large. Without a current path, the current balancing is not guaranteed, and over voltage may occur that other LED strings may be damaged. Hence, an open-circuit protection must be provided for safety. The dimming switch connected in series with an LED string creates open circuit, which must be prohibited for this design. In contrast, dimming switches 1010, 1020 in parallel with LED strings 1061, 1062 will realize PWM dimming safely as shown in FIG. 10. When a dimming switch S 1010, 1020 is on, the constant current flows into the dimming switch 1010, 1020 and the external voltage across the associated rectifier diodes and LED string(s) is kept zero. Since the associated rectifier diodes are reverse biased by the voltage across $C_f$ that $v_{C_f}$ will be discharged by the parallel connected LED loads. If a dimming switch S 1010, 1020 is off, the LED string 1061, 1062 is turned on. The rectified $i_{SEC}$ will charge $C_f$ rapidly to the LED string forward voltage. The dimming frequency $f_{dim}$ can be independent of the operating frequency of the converter. In consideration of light flicker perceived by human eyes, the dimming frequency $f_{dim}$ can be set higher than 3 kHz such that even at 100% current modulation, the visual distractions such as the phantom array can be eliminated [28].

In one embodiment of the present invention, if it is assumed that the PWM modulated current is a square pulse with duty ratio $D_{dim}$ and a dimming frequency $f_{dim}$, the current ripple factor after the filtration of $C_f$ is given by:

$$r_{dim} = \frac{\Delta I_{avg,dim}}{I_{avg,dim}} = \frac{1 - D_{dim}}{2 f_{dim} C_f R_{dyn}} \quad (33)$$

Hence, $$C_f = \max\left(\frac{1 - D_{dim}}{2 f_{dim} R_{dyn} r_{dim}}, C_{fmin}\right) \quad (34)$$

where $r_{dim}$ is within [0, 1] and can be assigned as 1 for $f_{dim} \geq 3$ kHz.

Additionally, the parallel dimming circuit can be easily incorporated into open-circuit protection. If one LED string 1061, 1062 is sensed open, the dimming switch S 1010, 1020 is turned on for the protection. Other LED strings 1061, 1062 can continue their normal operation.

III. Evaluation

According to one embodiment of the present invention, a prototype LED driver has been built for driving four LED strings having a total power of up to about 20 W. The Cree Cool white XR-E series LEDs are used in this prototype [29]. Typical current of one LED is 0.35 A with $V_F$=3.3V at 25° C. For a small number of balancing capacitors, N=2 and M=0 are selected. Two capacitors $C_{HB}$ with half-wave rectifiers are used.

Figure 11:
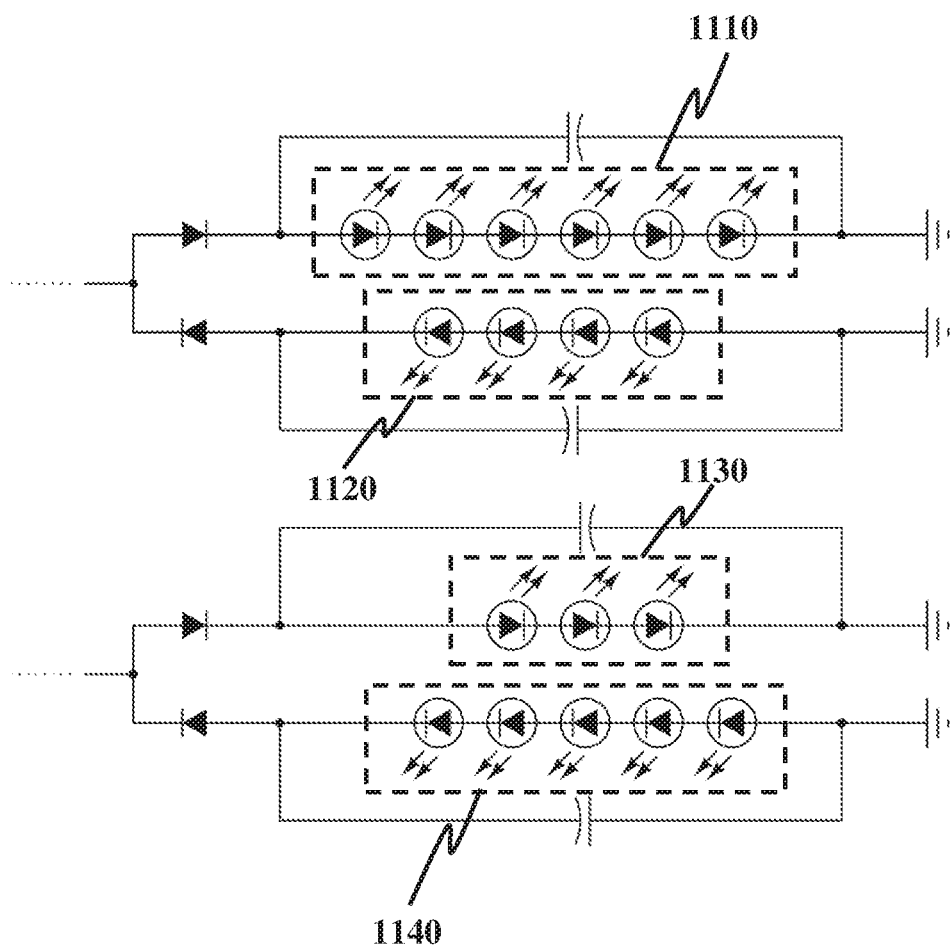
FIG. 11 is a circuit schematic of 4 LED strings used in the prototype.

To evaluate the current balancing performance, four LED strings having different numbers of LEDs in series are implemented, where string 1 1110 has six LEDs, string 2 1120 has four LEDs, string 3 1130 has three LEDs and string 4 1140 has five LEDs, as shown in FIG. 11.

The four switching MOSFETs are driven by a phase-shift controller UCC3895. The operating frequency j is 90 kHz. The input voltage is a 48V DC bus and D is designed as 0.95. The key parameters are listed in Table I.

TABLE 1

Key Parameters

| Parameter | Value |
|---|---|
| $L_1$ | 230 μH |
| $C_1$ | 13 nF |
| L | 16.5 μH |
| $C_{HB}$ | 10 nF |
| Transformer 1:n | 1:3 |
| Switches $Q_{1, 2, 3, 4}$ | IRF540 |
| Rectified diodes $D_{1, 2, 3, 4}$ | MBR20100CT |
| $C_{f1, 2, 3, 4}$ | 110 μF |

Figure 12:
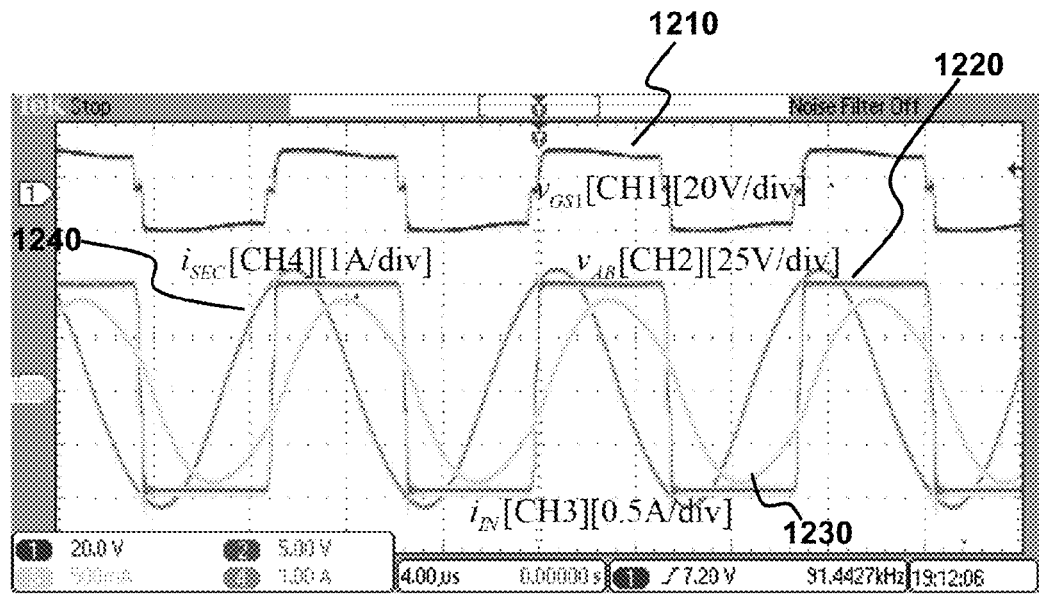
FIG. 12 is a diagram showing waveforms of $v_{GS1}$, $v_{AB}$, input current $i_{IN}$ and transformer secondary current $i_{SEC}$ at $V_{IN}$=48V.

FIG. 12 gives the waveforms of $Q_1$ gate voltage $v_{GS1}$ 1210, bridge voltage $v_{AB}$ 1220, input current $i_{IN}$ 1230 and transformer secondary current $i_{SEC}$ 1240 driving the four LED strings. From FIG. 12, the current $i_{IN}$ 1230 is nearly in phase with $v_{AB}$ 1220 to show that resistive input impedance eliminates most reactive power. The mostly pure sinusoidal waveform of $i_{IN}$ 1230 shows that the designed LCLC circuit has good filter performance and the accurate output current can be ensured. The measured $i_{SEC}$ 1240 agrees well with the calculation in (20). To investigate the characteristic of constant current source, LED string 3 is replaced with a large resistor via an electronic load, but still much smaller than the reactance of $C_{HB}$.

Figure 13:
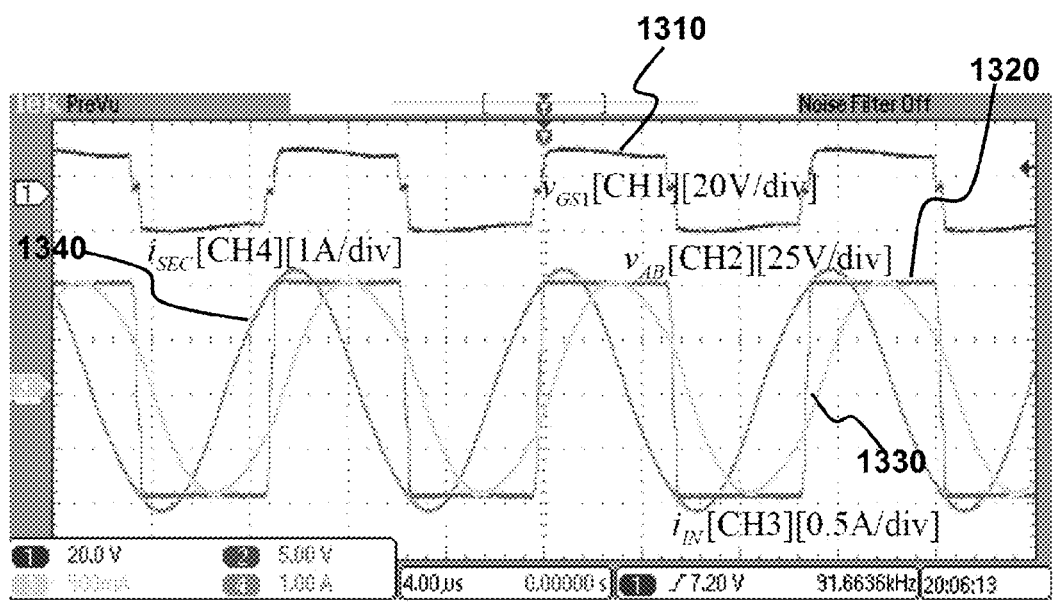
FIG. 13 is a diagram showing waveforms of $v_{GS1}$, $v_{AB}$, input current $i_{IN}$ and transformer secondary current $i_{SEC}$ with different loads at $V_{IN}$=48V.

FIG. 13 shows the corresponding waveforms $Q_1$ gate voltage $v_{GS1}$ 1310, bridge voltage $v_{AB}$ 1320, input current $i_{IN}$ 1330 and transformer secondary current $i_{SEC}$ 1340 in comparison with FIG. 12. Under the same test condition and variable load, the results show the same $i_{SEC}$ 1340, duty cycle and phase angle between $v_{AB}$ 1320 and $i_{IN}$ 1330. This verifies that the output current and input impedance are independent of load variation. The small phase angle of $i_{IN}$ 1330 lagging $v_{AB}$ 1320 ensures the ZVS of full-bridge switches in all load range.

Figure 14:
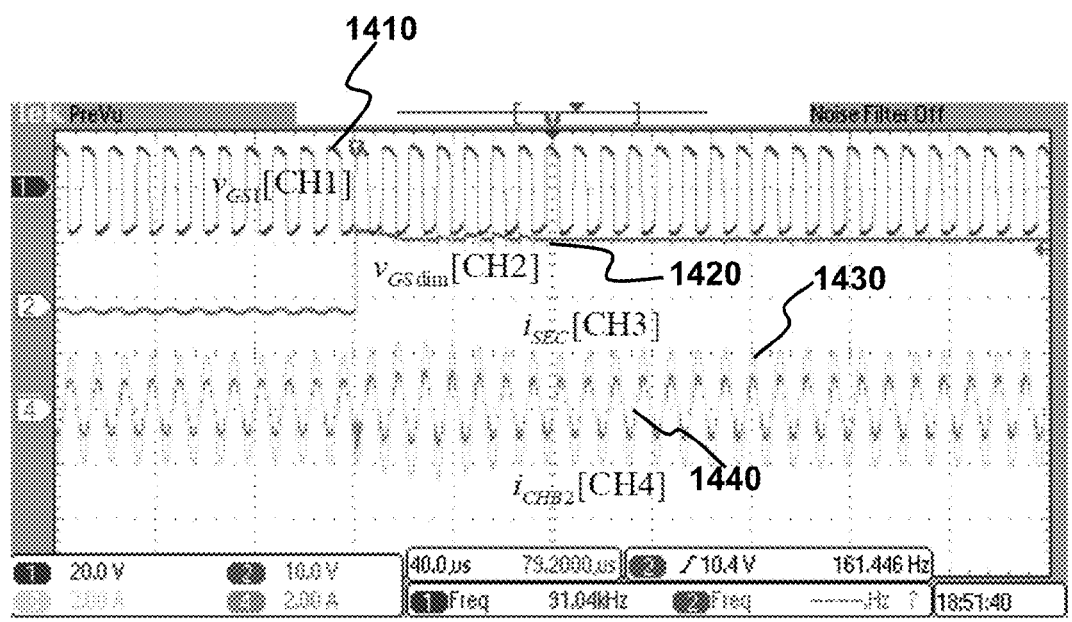
FIG. 14 is a diagram showing waveforms of $v_{GS1}$, $v_{AB}$, input current $i_{IN}$ and transformer secondary current $i_{SEC}$ with different loads at $V_{IN}$=48V.

The load-independent current source characteristic is also verified dynamically as shown in FIG. 14. FIG. 14 shows the waveforms $Q_1$ gate voltage $v_{GS1}$ 1410, dimming switch gate voltage $v_{GSdim}$ 1420, transformer secondary current $i_{SEC}$ 1430 and reactance current $i_{CHB2}$ 1440. When LED strings 1 and 2 are kept on and LED strings 3 and 4 are turned off by controlling the dimming switch with the dimming switch gate voltage $v_{GSdim}$ 1420, the currents $i_{SEC}$ 1430 and $i_{CHB2}$ 1440 are maintained at their original constant steady-state currents after several switching periods with LED-load-resistance variations from $R_{STR3,4}$ to zero. From FIG. 14, the magnitude of $i_{CHB2}$ is always half the magnitude of $i_{SEC}$ 1340, which shows the good current balancing against load variation.

Figure 15A:
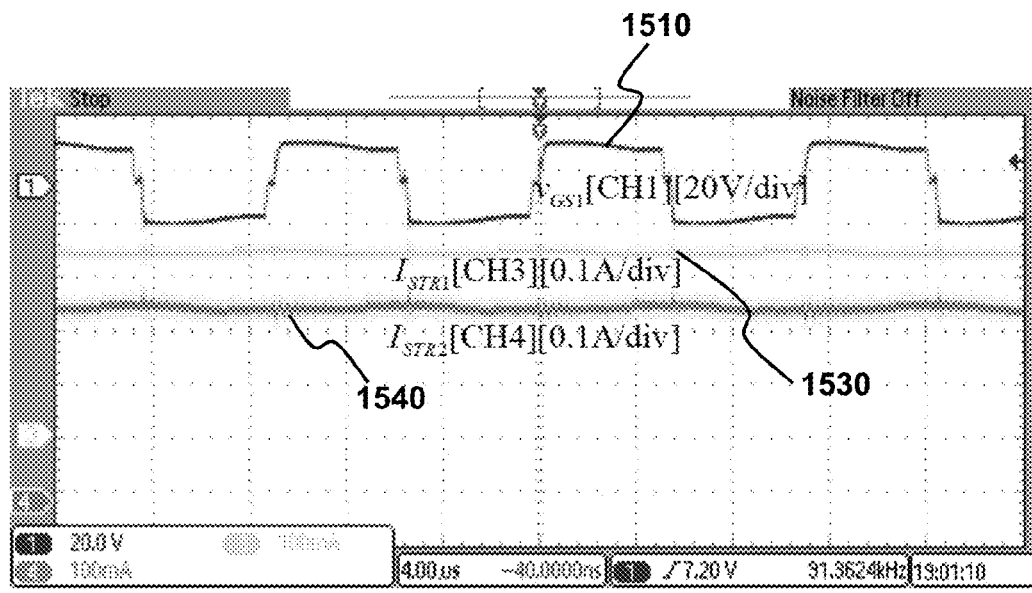
FIG. 15A is a diagram showing the DC currents flowing across the two LED strings with reference to the waveforms of the gate voltage at $V_{IN}$=48V.
Figure 15B:
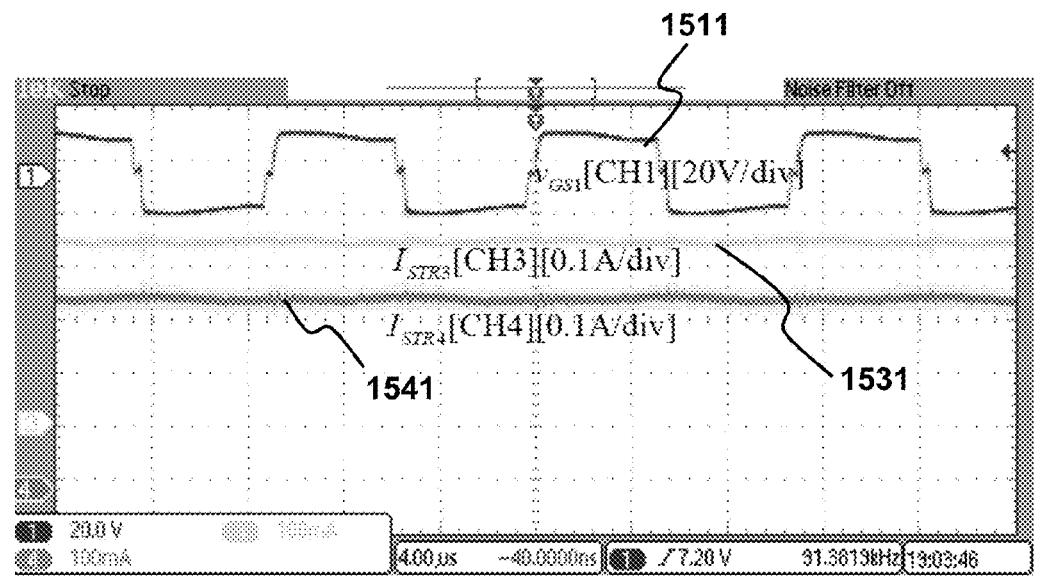
FIG. 15B is a diagram showing the DC currents flowing across the other two LED strings with reference to the waveforms of the gate voltage at $V_{IN}$=48V.

FIGS. 15A and 15B show the DC currents flowing across the four LED strings $I_{STR1}$ 1530, $I_{STR2}$ 1540, $I_{STR3}$ 1531 and $I_{STR4}$ 1541 with reference to the waveforms of $Q_1$ gate voltage $v_{GS1}$ 1510, 1511. With the reactance of $C_{HB}$ much larger than $R_{STR1,2,3,4}$, the proposed LED driver has good current balancing performance. With a well-designed LCLC circuit as described in an embodiment of the present invention according to Section II above, each string has the required current of 350 mA.

Figure 16:
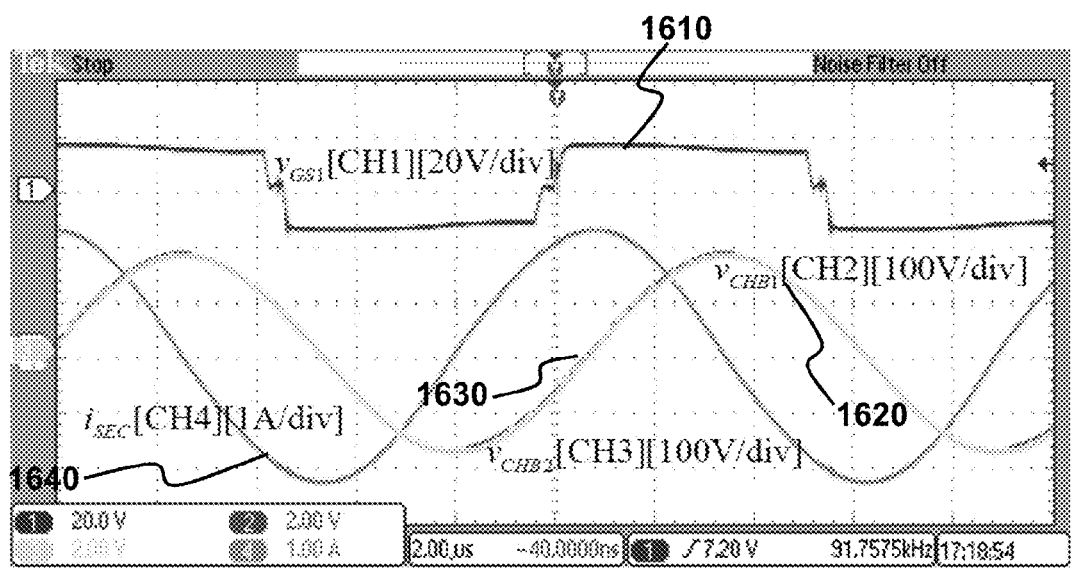
FIG. 16 is a diagram showing waveforms of $v_{GS1}$, $i_{SEC}$ and balancing capacitor voltages $v_{CHB1}$, $v_{CHB2}$.

The voltage stresses of $v_{CHB1}$ 1620 and $v_{CHB2}$ 1630 are measured in FIG. 16 with reference to the waveforms of $Q_1$ gate voltage $v_{GS1}$ 1610 and transformer secondary current $i_{SEC}$ 1640. Due to the small DC bias of every anti-paralleled LED resistance, $v_{CHB1}$ and $v_{CHB2}$ are almost the same and close to the calculated values. This verifies the theoretical calculations. The efficiency of the LED driver is as high as 91.23% at $V_{IN}$=48V with the four LED strings. The main losses are magnetic conduction losses and core losses in L and the transformer, whose optimization is omitted here.

Figure 17:
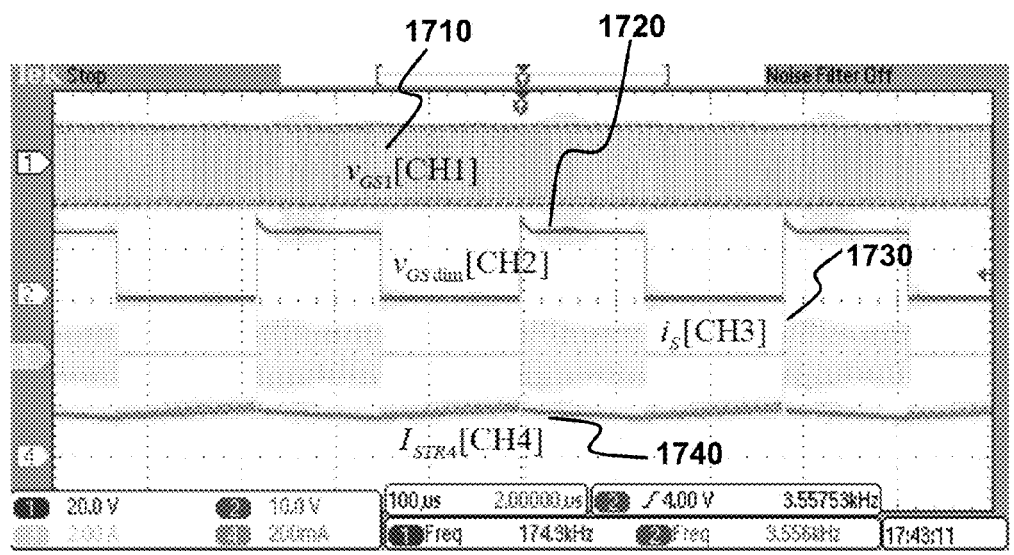
FIG. 17 is a diagram showing dimming-operation waveforms of $v_{GS1}$, $v_{GSdim}$, $i_S$ and $i_{STR4}$.

FIG. 17 shows waveforms of the main switch gate voltage $v_{GS1}$ 1710, the dimming switch gate voltage $v_{GSdim}$ 1720, the current $I_S$ 1730 of the dimming switch $S_2$ and $I_{STR4}$ 1740 of LED string 4 when LED strings 3 and 4 are dimmed with $D_{dim}$≈0.5 by $S_2$. The current ripple factor $r_{dim}$ is designed as 10%. The LED strings 1 and 2 are always on. The current $I_{STR3}$ has the same dimming waveform as $I_{STR4}$ and is not shown in FIG. 17. To avoid light flicker, $f_{dim}$ is chosen at 3.5 kHz. The measured current ripple is consistent with the theoretical calculation in (34).

IV. Conclusion

Current balancing techniques are important for driving multiple LEDs due to device variation and heterogeneous working environment. This paper proposes an optimized LCLC current-source-output LED driver with capacitive current balancing to realize zero input reactive power for switching devices, constant current output independent of LED load variation and current balancing for odd or even number of LED strings. The circuit is simple, reliable, economical and efficient for multiple LED string applications. Moreover, it is inherently short-circuit proof. The switch parallel to LED string can be readily implemented with the functions of dimming and open-circuit protection. Detailed design, analysis and implementation are introduced in the present invention. The experimental verifications have shown excellent agreement with the theoretical predictions.

In the embodiments disclosed herein, any control may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, microcontrollers, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A device for driving a plurality of LED strings with current balancing, comprising:
 a T circuit comprising an input capacitor, a body inductor, and a plurality of output capacitors; and
 at least one full-wave rectifier connecting one of the output capacitors of the T circuit to one of the LED strings, or at least one half-wave rectifier connecting one of the output capacitors of the T circuit to a pair of the LED strings;
 wherein:
 the input capacitor is selected to have a first capacitance value;

the output capacitors have a same value of capacitance; and the same value of capacitance is given by the first capacitance value divided by the number of the output capacitors.

2. The device of claim 1, wherein the T circuit further comprises an isolation transformer.

3. The device of claim 2, wherein the T circuit further comprises a body inductor connected in parallel to the isolation transformer.

4. The device of claim 1, further comprising a dimming switch connected in parallel to one of the LED strings.

5. The device of claim 4, wherein the filter inductor and the input capacitor of the T circuit are configured such that one or more high order harmonics of an AC input to the T circuit are filtered out.

6. The device of claim 1, further comprising a filter inductor connecting in series to the input capacitor of the T circuit.

7. The device of claim 1, further comprising a full-bridge circuit connected to the input capacitor of the T circuit.

8. A device for driving a plurality of LED strings with current balancing, comprising:
- a T circuit comprising an input capacitor, a body inductor, and a plurality of output capacitors, wherein the output capacitors have a same value of capacitance;
- at least one full-wave rectifier connecting one of the output capacitors of the T circuit to one of the LED strings, or at least one half-wave rectifier connecting one of the output capacitors of the T circuit to a pair of the LED strings; and
- a dimming switch connected in parallel to one of the LED strings.

* * * * *